(12) United States Patent
Al-Hamad et al.

(10) Patent No.: US 9,752,879 B2
(45) Date of Patent: Sep. 5, 2017

(54) SYSTEM AND METHOD FOR ESTIMATING HEADING MISALIGNMENT

(71) Applicant: INVENSENSE INCORPORATED, San Jose, CA (US)

(72) Inventors: Amr Al-Hamad, Calgary (CA); Abdelrahman Ali, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/686,441

(22) Filed: Apr. 14, 2015

(65) Prior Publication Data

US 2016/0305782 A1    Oct. 20, 2016

Related U.S. Application Data

(63) Continuation-in-part of application No. 14/761,156, filed on Jul. 15, 2015.

(51) Int. Cl.
*G01C 21/16*     (2006.01)
*G01P 15/02*     (2013.01)

(52) U.S. Cl.
CPC .................................. *G01C 21/16* (2013.01)

(58) Field of Classification Search
CPC ................................ G01C 21/16; G01P 15/02
See application file for complete search history.

(56) References Cited

U.S. PATENT DOCUMENTS

| | | | | |
|---|---|---|---|---|
| 5,527,003 A * | 6/1996 | Diesel | ................... | G05D 1/101 244/195 |
| 9,151,613 B2 * | 10/2015 | Czompo | ................ | G01C 21/00 |
| 9,228,836 B2 * | 1/2016 | Girod | .................... | G01C 15/00 |
| 9,250,083 B2 * | 2/2016 | Czompo | ............ | G01C 21/165 |
| 2007/0240486 A1* | 10/2007 | Moore | ................... | G01C 21/16 73/1.37 |
| 2012/0221244 A1* | 8/2012 | Georgy | ................ | G01C 21/165 701/472 |
| 2012/0245839 A1* | 9/2012 | Syed | ..................... | G01C 21/165 701/408 |
| 2013/0029681 A1* | 1/2013 | Grokop | .................. | G01C 21/16 455/456.1 |
| 2013/0054181 A1* | 2/2013 | Lakhzouri | .............. | G01C 21/16 702/141 |
| 2013/0158928 A1* | 6/2013 | Hogdal | .................. | G01C 21/20 702/104 |
| 2014/0142885 A1* | 5/2014 | Chowdhary | ........... | G01C 21/12 702/141 |

(Continued)

*Primary Examiner* — Rodney Butler
(74) *Attorney, Agent, or Firm* — Bay Area Technology Law Group, PC

(57) ABSTRACT

This disclosure relates to heading misalignment estimation with a portable device and more specifically to estimating misalignment between a portable device having a sensor assembly and a platform transporting the portable device when the platform is undergoing motion having periodic characteristics. In one aspect, a suitable method includes obtaining inertial sensor data for the portable device and determining an effective frequency characteristic of the inertial sensor data representing the motion having periodic characteristics. The inertial sensor data may be processed using the determined frequency characteristic so that a heading misalignment may be estimated between the heading of the portable device and the platform.

37 Claims, 33 Drawing Sheets

(56) References Cited

U.S. PATENT DOCUMENTS

| | | | |
|---|---|---|---|
| 2014/0188638 A1* | 7/2014 | Jones | H04M 1/72569 705/16 |
| 2014/0297212 A1* | 10/2014 | Anderson | G01C 25/005 702/90 |
| 2014/0372026 A1* | 12/2014 | Georgy | G01S 19/47 701/469 |
| 2015/0316579 A1* | 11/2015 | Pakzad | G01P 15/02 702/150 |
| 2015/0345952 A1* | 12/2015 | Chang | G01C 21/12 701/541 |
| 2015/0354951 A1* | 12/2015 | Ali | G01C 21/16 702/141 |
| 2016/0007158 A1* | 1/2016 | Venkatraman | H04W 4/023 455/456.2 |
| 2016/0071383 A1* | 3/2016 | Baldwin | G08B 6/00 340/407.1 |

* cited by examiner

SYSTEM AND METHOD FOR ESTIMATING HEADING MISALIGNMENT

CROSS REFERENCE TO RELATED APPLICATIONS

This application is a continuation-in-part of U.S. patent application Ser. No. 14/761,156, filed Jul. 15, 2015, which is assigned to the assignee hereof and is incorporated by reference in its entirety.

FIELD OF THE PRESENT DISCLOSURE

This disclosure generally relates to techniques for estimating heading misalignment and more specifically to estimating misalignment between a portable device having a sensor assembly and a platform transporting the portable device when the platform is undergoing motion having periodic characteristics.

BACKGROUND

Portable electronic devices, such as those configured to be handheld or otherwise associated with a user, are employed in a wide variety of applications and environments. The ubiquity of such devices as mobile phones, tablets, digital still cameras and video cameras, handheld music and media players, portable video game devices and controllers, mobile internet devices (MIDs), personal navigation devices (PNDs), smart watches, smart glasses, belt clips or other wearables, and other similar devices indicates the popularity and desire for these types of devices. Increasingly, such devices are equipped with one or more sensors or other systems for determining the position or motion of the portable device, including inertial navigation techniques based upon the integration of specific forces and angular rates as measured by inertial sensors (e.g. accelerometer, gyroscopes).

Often, such portable devices may be associated with a platform that transports the device, as in the example of a mobile phone being carried by a user. Further, many situations exist in which the motion of the platform exhibits periodic characteristics. This may include on foot motion of the user, such as walking, running and other similar forms of locomotion involving the periodic repetition of steps. Similarly, other types user activity may also exhibit periodic motion characteristics, including swimming, biking, skiing, rowing and others. Additionally, the user of the portable device or the portable device itself may be associated with a platform other than the user that nevertheless exhibits periodic motion characteristics, such as horseback riding.

Although the portable device generally may be transported in the direction of movement of the platform, its orientation may not be constrained, resulting in a misalignment of a heading determined for the device with the platform heading (direction of motion or direction of the along-track movement of the platform). As in the example of a mobile phone, it may be held in the user's hand and employed in a variety of orientations or carried in a pocket, holster, bag or other manners.

In contrast, traditional systems typically involve a device tethered to the platform so that measurements from the device may be used to determine the position, velocity and attitude of the device and/or the platform. For example, alignment of the inertial sensors within the platform (i.e. alignment of the device containing the sensors with the platform's forward, lateral and vertical axis) may be required for traditional inertial navigation systems, such that when the inertial sensors are not properly aligned, the positions and attitude calculated using measurements from the inertial sensors are not necessarily representative of the state of the platform. Thus, traditional systems achieve high accuracy navigation solution by tethering the inertial sensors within the platform with accurate aligning of the device axes with respect to platform axes. As noted, mobile or portable devices can be moved, whether constrained or unconstrained within the platform (such as for example a person, vehicle, or vessel of any type), and careful mounting or tethering of the device to the platform is not an option.

Accordingly, existing portable devices having navigational capabilities may achieve accurate attitude and position of the platform under at least one of the following three conditions of known information:

1) absolute attitude angles for the device and the platform;
2) absolute attitude angles for the device and the misalignment between the device and platform;
3) absolute attitude angles for the platform and the misalignment between the device and platform.

Thus, it will be appreciated that knowledge of misalignment may enable navigation techniques for a portable device without requiring separate assemblies of sensors for the device and the platform.

In addition to sensor-based inertial navigation systems, a portable device may also be equipped with reference-based position determination systems. As one example, a portable device may utilize a Global Navigation Satellite System (GNSS), such as Assisted Global Positioning System (AGPS) system having high sensitivity capabilities capable of providing absolute positioning of the platform (e.g. user) even in environments without a clear line of sight to satellite signals. Nevertheless, in some situations, GPS information alone may be inadequate enough, such as deep indoors or in challenging downtown navigation or localization. Other reference-based position determination systems may rely on cell tower identification or, if possible, trilateration of cell towers or other wireless communication signals to obtain a position fix to supplement a GPS system or to be used in the alternative.

Despite these and other known positioning methods available in many portable devices, accurate indoor localization still presents a challenge and may be inadequate to satisfy the accuracy demands of current location based services (LBS). Additionally, these reference-based methods may only provide the absolute heading of the platform, without any information on the device's heading.

Therefore, there is a need for portable device navigation techniques capable of accurately utilizing measurements from an inertial sensor assembly of the portable device within a platform, and thereby determining the navigation state of the device and/or platform without any constraints on the platform (i.e. in indoor or outdoor environments) or the orientation of the portable device with respect to the platform. In one aspect, this may include estimating heading misalignment between the portable device and the platform. There is a further need for making such determinations in a manner that is independent of the usage of the device (e.g. the way the user is holding or moving the device during navigation). Similarly, it would be desirable to make such determinations without requiring the orientation of the portable device to be constrained with respect to the platform. The following disclosure satisfies these and other needs.

SUMMARY

As will be described in detail below, this disclosure includes methods for navigation with a portable device. The portable device may be associated with a platform undergoing motion having periodic characteristics. The techniques may include obtaining inertial sensor data for the portable device, determining an effective frequency characteristic of the inertial sensor data, processing the inertial sensor data based at least in part on the determined frequency characteristic and estimating a heading misalignment between a heading of the portable device and the platform using the processed inertial sensor data.

This disclosure also includes a portable device that includes a sensor assembly integrated with the portable device that outputs inertial sensor data and a heading misalignment estimator configured to determine an effective frequency characteristic of the inertial sensor data, wherein the effective frequency characteristic of the inertial sensor data represents periodic characteristics of motion of a platform of the portable device, process the inertial sensor data based at least in part on the determined frequency characteristic and estimate a heading misalignment between a heading of the portable device and the platform using the processed inertial sensor data.

DETAILED DESCRIPTION

Figure 1:
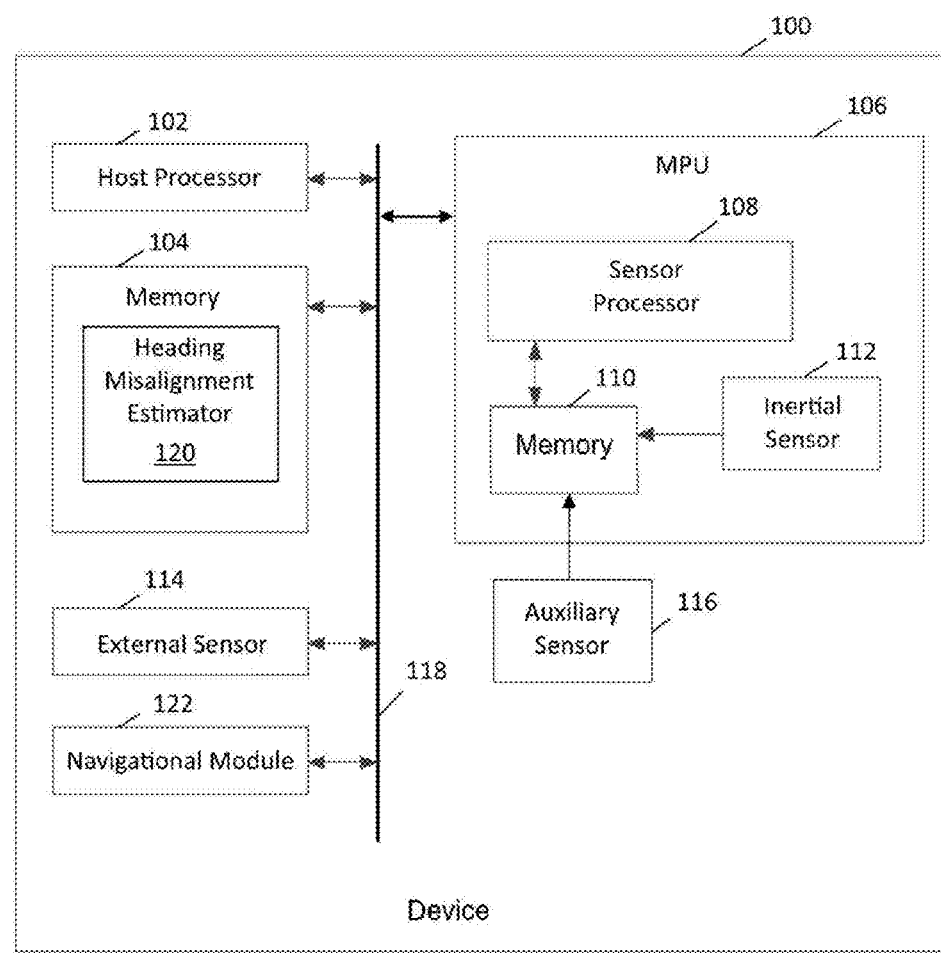
FIG. 1 is schematic diagram of a portable device for estimating heading misalignment according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" of the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one of more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

Many portable devices, such as mobile phones, tablets, smart watches, smart glasses, belt clips and other APPlication acCESSORIES (or Appcessories for short), are equipped with Micro Electro Mechanical System (MEMS) sensors that are used predominantly for screen control and entertainment applications. These sensors present challenges when used for navigation purposes due to relatively high noise and random drift rates, as well as frequently changing orientations with respect to the carrying platform or person. Magnetometers are also found within many portable devices. In some cases, it has been shown that a navigation solution using accelerometers and magnetometers may be possible if the user is careful enough to keep the device in a specific orientation with respect to their body, such as when held carefully in front of the user after calibrating the magnetometer.

As noted above, there is a need for a navigation solution capable of accurately utilizing measurements from such portable devices when being transported by a platform to determine the navigation state of the device/platform without any constraints on the platform (i.e. in indoor or outdoor environments) or the mobility of the device. It is further desirable that the estimation of the position and attitude of the platform be independent of the usage of the device (e.g. the way the user is holding or moving the device during navigation).

In addition to the above mentioned application of portable devices, such as for example smart phones and tablets, (that may involve a full navigation solution including position, velocity and attitude, or position and attitude), there are other applications (that may involve estimating a full navigation solution, or an attitude only solution or an attitude and velocity solution) where the method to mitigate the aforementioned problems is needed for enhancing the user experience and usability, and may be applicable in a number of scenarios, including the non-limiting examples of video gaming equipment, augmented reality equipment, wearable computing devices (such as for example smart wrist watches, and smart glasses) and other appcessories.

As noted above, a portable device embodying aspects of this disclosure may include a sensor assembly including inertial sensors providing measurements that may be used to develop or enhance a navigation solution for the portable device and/or the conveying platform. In one aspect, this may include estimating a heading misalignment of the portable device with respect to the platform. To help illustrate these features, a representative portable device 100 is depicted in FIG. 1 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, mobile internet device (MID), personal navigation device (PND), digital still camera, digital video camera, binoculars, telephoto lens, portable music, video, or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc. for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using MEMS to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Alternatively, or in addition, device 100 may implement a sensor assembly in the form of external sensor 114. External sensor may represent one or more sensors as described above, such as an accelerometer anchor a gyroscope, that measures parameters for characterizing on foot motion. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to determine misalignment of portable device 100 may be implemented through heading misalignment estimator 120 as a set of suitable instructions stored in memory 104 that may be read and executed by host processor 102. Other embodiments may feature any desired division of processing between host processor 102, MPU 106 and other resources provided by device 100, or may be implemented using any desired combination of software, hardware and firmware. In some embodiments, heading misalignment estimator 120 may include a periodic motion detector configured to detect motion involving a sequence of possible periodic cycles that may be associated with movement of the user as described above, including swimming, rowing, cycling, etc. or periodic motion characteristics of a platform other than the user.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc, and may take the form of a computer program product accessible from a computer-usable or computer-readable medium providing program code for use by or in connection with a computer or any instruction execution system, such as host processor 102, sensor processor 108, a dedicated processor or any other processing resources of device 100.

Device 100 may also include navigational module 122 that employs a reference-based strategy, a self-contained strategy, or any combination of strategies. Navigational module 122 may provide any desired degree of location awareness capabilities. Representative technologies that may be embodied by navigational module 122 include global positioning system (GPS), global navigation satellite system (GLONASS), Galileo and Beidou, as well as WiFi™ positioning, cellular tower positioning, Bluetooth™ positioning beacons, dead reckoning or other similar methods. Navigational module 122 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Alternatively or in addition, navigational module 122 may employ inertial navigation techniques utilizing sensor data, such as from inertial sensor 112 and/or external sensor 114. Such techniques may involve dead reckoning or the like, and may determine an orientation for device 100, including values such as any roll, pitch, and azimuth (heading) angles.

Figure 2:
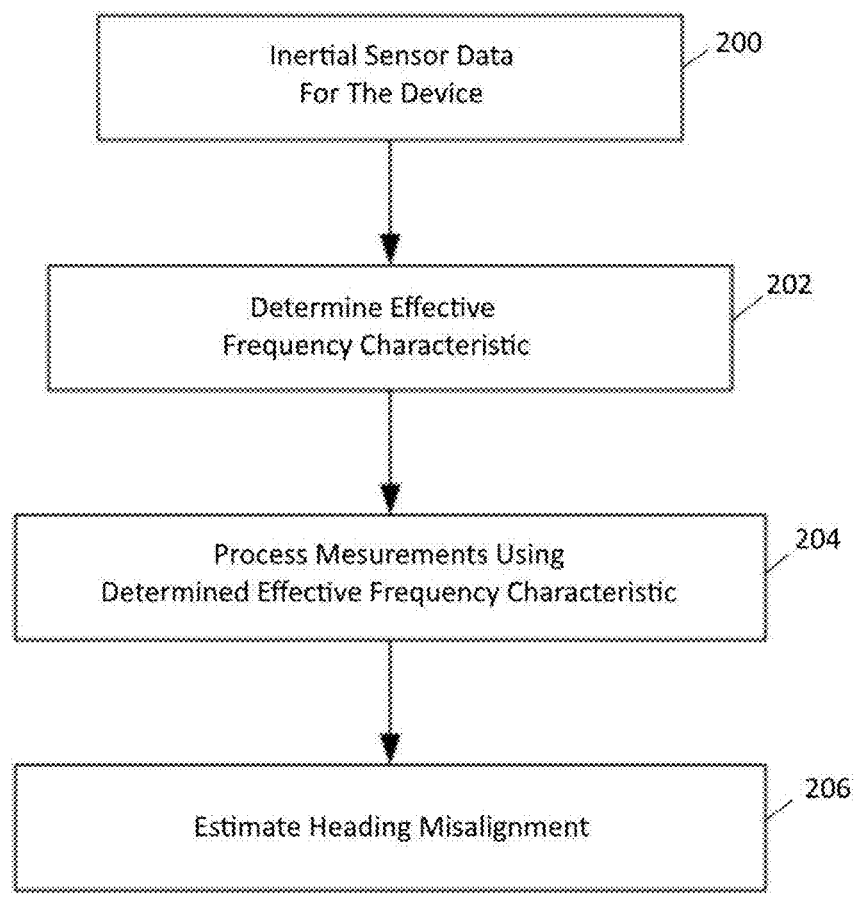
FIG. 2 is a flowchart showing a routine for estimating heading misalignment according to an embodiment.

Representative operations that may be performed by heading misalignment estimator 120 are depicted in the flow chart of FIG. 2. Beginning with 200, inertial sensor data may be obtained that represents motion of device 100, such as from accelerometer and/or gyroscope data from inertial sensor 112 or any other suitable sources of measurement, including external sensor 114. The inertial sensor data may also have been processed by navigation module 122 to represent an orientation of device 100, such as in the form of determined roll or pitch angles. A suitable frequency characteristic associated with periodic motion of the user or other platform may be determined from the sensor measurements in 202. Further details regarding this aspect are described below. Next, in 204, the sensor measurements, such as accelerometer data, may be processed using the determined effective frequency characteristic. In one aspect, as also described below, this may include reconstructing the measurements to remove noise, vibration, disturbances or other artifacts. Then, the processed sensor measurements may be used to estimate heading misalignment of device 100 in 206.

As noted, estimation of heading misalignment may be improved by compensating for artifacts in the measurements obtained from the sensor assembly. For the purposes of this disclosure, the term "artifact" means any noise, disturbance, vibration, jitter or the like that may be manifest in the sensor data. In one aspect, these unwanted characteristics may be exacerbated by the lack of constraint between portable device 100 and the platform. Artifacts in the measurements of the sensor assembly may undesirably add more weight in a false direction of motion, such as side-track motion direction versus along-track motion direction, resulting in a less accurate heading misalignment estimation. As will be appreciated, errors in the estimated misalignment angle value has a great impact on the estimated user or platform direction from a navigation algorithm. Hence, detecting and removing artifacts facilitates the navigation system in providing an accurate platform along-track axis even in the absence of any absolute reference for heading. The along-track axis is the axis in the direction of motion of the platform, it can also be called motion direction axis.

As noted above, the operations described as being performed by heading misalignment estimator 120 may be performed by any number of routines or algorithms implemented by any combination of available processing resources. For example, initial processing of gyroscope and/or accelerometer data, such as associated with 202 and/or 204, may be performed by sensor processor 108 before being passed to host processor 104 for subsequent operations, such as estimation of heading misalignment in 206.

In one aspect, the techniques of this disclosure may include processing accelerometer data. Processing the accelerometer data may include reducing signal artifacts.

In one aspect, determining the effective frequency characteristic of the inertial sensor data may include performing a time domain analysis. The time domain frequency analysis may be performed on a periodic signal selected from at least one of accelerometer data, leveled accelerometer data, gyroscope data, leveled gyroscope data, roll data for the portable device and pitch data for the portable device. A use case and/or a motion mode for the portable device may be classified so that the periodic signal for performing the time domain analysis is selected based at least in part on the classification.

In one aspect, the time domain analysis may calculate peak frequency in the obtained inertial sensor data. The sensor data may be processed with the calculated peak frequency to reduce the artifacts. The technique may include determining coefficients at the calculated peak frequency. Processing the inertial sensor data may include applying the determined coefficients to reconstruct the inertial sensor data to reduce the artifacts.

In one aspect, determining the effective frequency characteristic of the inertial sensor data may include performing a frequency domain analysis. The frequency domain frequency analysis may be performed on a periodic signal selected from at least one of accelerometer data, leveled accelerometer data, gyroscope data, leveled gyroscope data, roll data for the portable device and pitch data for the portable device. A use case and/or a motion mode for the portable device may be classified so that the periodic signal for performing the frequency domain analysis is selected based at least in part on the classification.

In one aspect, the frequency domain analysis may include performing a Fast Fourier Transform (FFT). A maximum amplitude frequency component corresponding to the effective frequency characteristic may be determined. The sensor data may be processed with the determined maximum amplitude frequency component to reduce the artifacts. Coefficients may be determined at the maximum amplitude frequency component. Processing the inertial sensor data may include applying the determined coefficients to reconstruct the inertial sensor data to reduce the artifacts.

In one aspect, processing the inertial sensor data may include applying a band pass filter. A use case and/or a motion mode for the portable device may be classified so that band pass filter is selected based at least in part on the classification.

In one aspect, estimating the heading misalignment may be based at least in part on a maximum variance of the processed inertial sensor data. The maximum variance of the processed inertial sensor data may be determined using a Principle Component Analysis (PCA), using a binary search, and/or by analytically determining an along-track axis representing a minimum sum of squared distances.

In one aspect, the techniques of this disclosure may include resolving an ambiguity in the estimated heading misalignment.

In one aspect, the ambiguity may be resolved by assessing a difference between two angles calculated between a vertical acceleration of the portable device and an along-track axis acceleration of the portable device. The difference between two angles calculated between a vertical acceleration of the portable device and the along-track axis acceleration of the portable device may be determined as a difference between an angle representing a phase shift between a lagging vertical acceleration signal and a leading along-track axis acceleration signal and an angle representing a phase shift between a leading vertical acceleration signal and a lagging along-track axis acceleration signal.

In one aspect, the ambiguity may be resolved by assessing phase shift between a vertical acceleration of the portable device and an along-track axis acceleration of the portable device.

In one aspect, the ambiguity may be resolved by determining effective motion parameters based at least in part on a maximum variance between a vertical acceleration of the portable device and an along-track axis acceleration of the portable device. The maximum variance may be determined using a PCA, and/or by calculating a slope of a principle axis between the vertical acceleration of the portable device and the along-track axis acceleration of the portable device, wherein the principal axis may be obtained using a binary search and/or by analytical calculation using the fact that the principal axis represents a minimum sum of squared distances.

As noted, the techniques of this disclosure include a portable device having a sensor assembly integrated with the portable device that outputs inertial sensor data and a heading misalignment estimator configured to determine an effective frequency characteristic of the inertial sensor data, wherein the effective frequency characteristic of the inertial sensor data represents periodic characteristics of motion of a platform of the portable device, process the inertial sensor data based at least in part on the determined frequency characteristic and estimate a heading misalignment between a heading of the portable device and the platform using the processed inertial sensor data.

In one aspect, the heading misalignment estimator may be configured to determine the effective frequency characteristic of the inertial sensor data by performing a time domain analysis.

In one aspect, the heading misalignment estimator may be configured to determine the effective frequency characteristic of the inertial sensor data by performing a frequency domain analysis.

In one aspect, the device may include a band pass filter, so that the heading misalignment estimator may process the inertial sensor data by applying the band pass filter.

In one aspect, the heading misalignment estimator may also be configured to resolve an ambiguity in the estimated heading misalignment.

In one aspect, the sensor assembly comprises an inertial sensor implemented as a Micro Electro Mechanical System (MEMS).

Non-limiting examples of device architectures and suitable techniques for heading misalignment estimation are described in the material below.

EXAMPLES

The following examples illustrate various techniques for processing measurements of the motion sensors to reduce or remove signal artifacts. These techniques may include analyzing the sensor data to determine the effective frequency characteristic used for artifact reduction or may determine the effective frequency characteristic by applying a predetermined frequency characteristic depending on a use case and/or a motion mode of the portable device.

Figure 3:
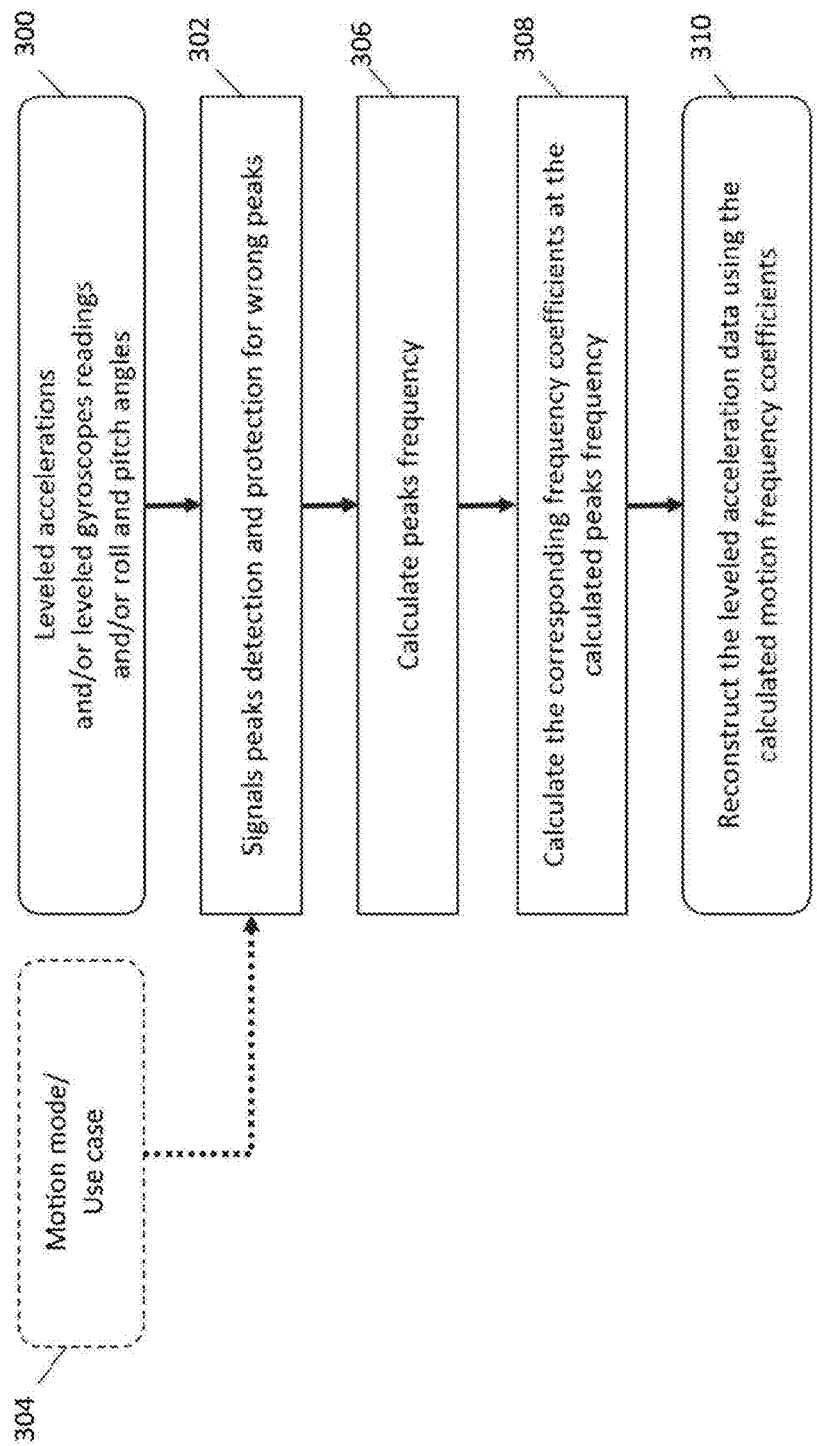
FIG. 3 is a flowchart showing a routine for estimating heading misalignment using time domain analysis according to an embodiment.

One representative routine for heading misalignment estimation is depicted in the flow chart of FIG. 3 and involves performing a time domain analysis to determine an effective frequency characteristic. Beginning with 300, inertial sensor data for device 100 is obtained from a suitable source, such as inertial sensor 112. As indicated, this may include any or all of values such as gyroscope readings, accelerometer readings, pitch angles and roll angles. Further, the accelerometer and/or gyroscope data may be leveled using an estimated orientation of device 100 to isolate vertical or horizontal components as desired. In 302, a plurality of peaks may be detected in the inertial sensor data. This process may also include discarding misidentified peaks.

Optionally, as indicated by 304, the selection of which measurements to analyze when determining the effective frequency characteristic may depend in part on a motion mode and/or a use case for device 100. As used herein, "motion mode" refers to the current status of the platform with regard to the type of motion it is undergoing. For examples in which the platform is the user, this may include how the user is moving, such as walking, running, swimming, cycling and the like. For other platforms, it may be characteristic of how the user is being conveyed by the platform, such as horseback riding. Further, "use case" is used herein to refer to the type of interaction between device 100 and the platform, and may include whether the user is carrying the device, holding the device with a swinging arm, positioning it "on ear" when talking, inputting data or viewing in a navigation or texting operation, and other usages of device 100 that affect its orientation with respect to the user or other platform. In one aspect, use case may be dictated in part by the form factor of device 100, such as in smart glasses that are worn on the face or a smart watch that is worn on the wrist.

For example, when the device is used for texting or viewing information, the peaks frequency of the vertical acceleration signal may be used while the leveled horizontal acceleration peaks frequency may be used if the device is detected to be swinging in the user's hand. Further, when roll and pitch angle data is used for peaks frequency analysis, the effective component of both may first be identified to allow the signal having a bigger variation to be used as the attitude component to represent the orientation data. Any trade off between the use of horizontal component peaks frequency and an attitude component peaks frequency depends on the smoothness of the signal and the degree of change in the signal slope.

Next, in 306, a suitable time domain analysis may be performed to calculate peaks frequency. The term "peaks frequency" may be used to refer to the number of the detected signal peaks in one second. In one embodiment, the differences between consecutive peaks may be summed, averaged and then multiplied by the sensors' data rate to calculate signal peaks frequency as indicated by Equation 1:

$$\text{Peaks\_freq} = \text{Sensors\_rate} * \left( \frac{(\text{peaks\_num} - 1)}{\sum \text{distances\_between\_peaks}} \right) \quad (1)$$

Since the effective frequency characteristic in the form of the calculated peaks frequency is expected to correlate with periodic motion of the platform, this information may be used to selectively weight the inertial sensor data and thereby reduce artifacts in the signal. As indicated by 308, this may include calculating frequency coefficients at the determined peaks frequency. The inertial sensor data may be reconstructed by applying these coefficients to reduce artifacts in 310. In this embodiment, the coefficients are shown to be applied to leveled accelerometer data, but these techniques may be applied to any of the types of inertial sensor data described above.

Figure 4:
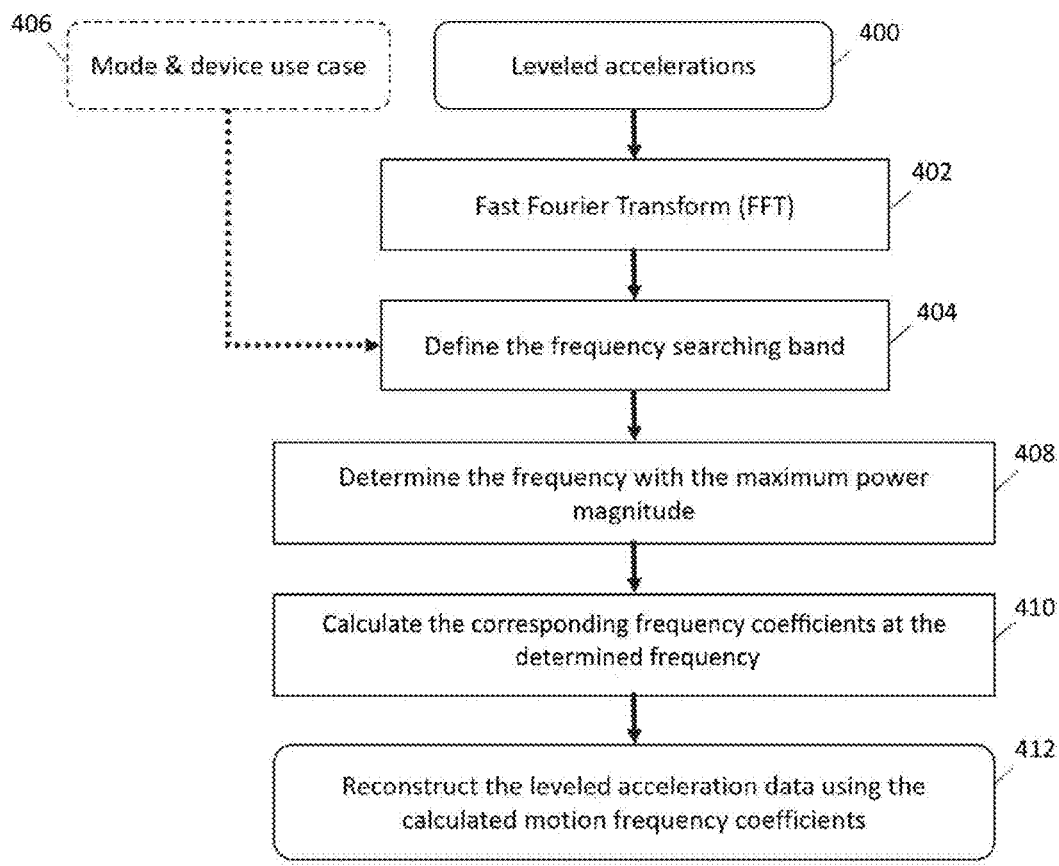
FIG. 4 is a flowchart showing a routine for estimating heading misalignment using frequency domain analysis according to an embodiment.

Another representative routine for heading misalignment estimation that involves performing a frequency domain analysis to determine an effective frequency characteristic is depicted in the flow chart of FIG. 4. Beginning with 400, inertial sensor data for device 100 is obtained from a suitable source, such as inertial sensor 112. In this embodiment, leveled accelerometer data is employed but other sensor measurements, such as gyroscope readings, accelerometer readings, pitch angles or roll angles may be used as desired. Analysis of the inertial sensor data may employ any of various frequency domain representation methods (e.g. Fourier transform or wavelet) to allow reduction of artifacts in the frequency domain, such as the use of Fast Fourier Transform (FFT) as indicated by 402. FFT is an algorithm to compute the Discrete Fourier transform (DFT) and the inverse (IDFT), converting time space to frequency space (or wavenumber) and vice versa. As will be appreciated, an FFT-based approach targets finding the effective frequency for each signal, such as x, y and z leveled accelerations data. The FFT may be applied over a suitable window, including a data length of two seconds at the sensors data rate. As such, the $k^{th}$ Discrete Fourier Transform component with FFT of N points may be calculated as indicated by Equation 2:

$$Y_k = \sum_{i=1}^{N} \left( X(i) * e^{-\left(\frac{j2\pi(k)(i-1)}{N}\right)} \right) \quad (2)$$

where $$0 \leq k \leq \frac{N}{2} + 1$$

Each $k^{th}$ component of the FFT consists of two parts; real and imaginary parts R+Ij, allowing its amplitude to be determined as indicated in Equation 3:

$$|Y_k| = \frac{2}{\text{window\_size}} \left( \sqrt{R^2 + I^2} \right) \quad (3)$$

where $$0 \leq k \leq \frac{N}{2} + 1$$

In turn, the corresponding frequency of each component can be calculated as shown in Equation 4, in which $F_s$ is the sampling frequency, $f_k(0)=0$ Hz (DC component), $f_k(N/2)=(F_s/2)$Hz and each frequency step equals $F_s/N$:

$$f_k(i) = F_s * \frac{i}{N} \quad (4)$$

where $$0 \leq i \leq \frac{N}{2}$$

Based on these equations, a frequency searching band may be defined in 404, which is expected to include the effective frequency characteristic of the periodic motion of the platform. The definition of the frequency searching band may optionally depend on a motion mode and/or a use case for device 100 as indicated by 406, in a similar manner to that described above.

Next, in 408, the frequency component exhibiting maximum amplitude or power magnitude may identified as the effective frequency characteristic. The determination may be made with respect to one axis of the accelerometer data, or other suitable inertial sensor data may be used as desired. As described above, the effective frequency is expected to correlate with periodic motion of the platform and may be used to selectively weight the inertial sensor data. As indicated by 410, this may include calculating frequency coefficients at the maximum power magnitude frequency. The inertial sensor data then may be reconstructed by applying these coefficients to reduce artifacts in 412. In this embodiment, the coefficients are shown to be applied to leveled accelerometer data, such as by using the DC components, real coefficient, and the imaginary coefficient of the effective frequency. However, these techniques may be applied to any of the types of inertial sensor data described above.

Figure 5:
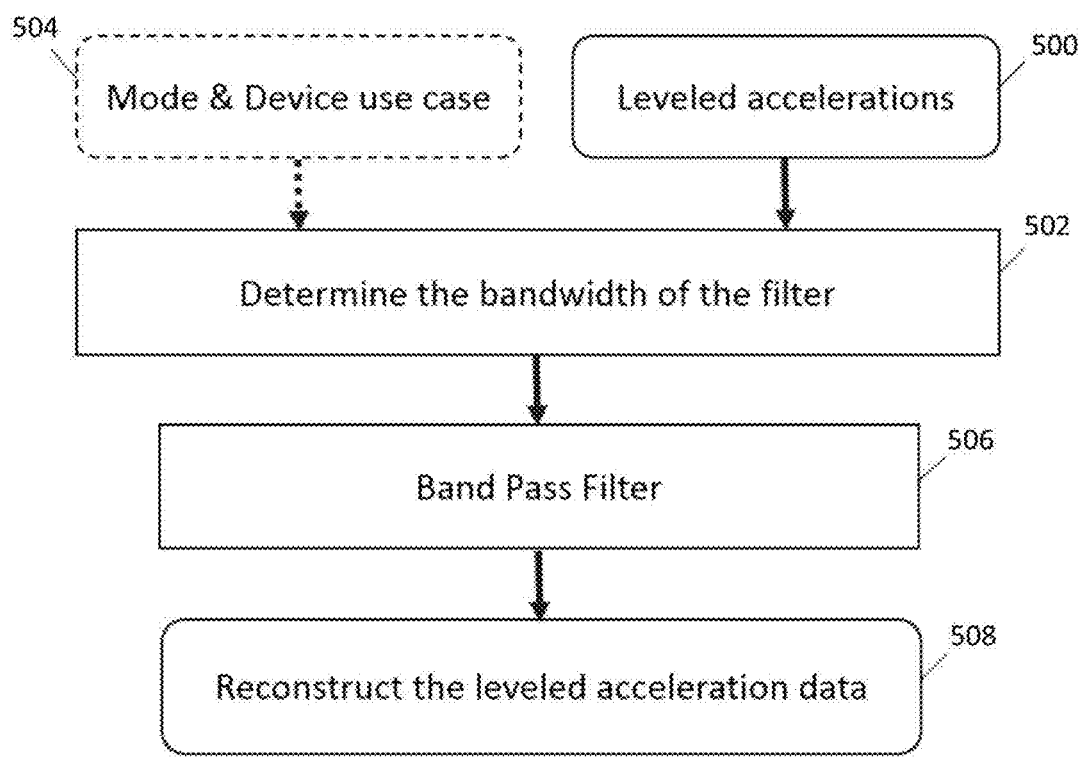
FIG. 5 is a flowchart showing a routine for estimating heading misalignment by applying a band pass filter according to an embodiment.

Yet another representative routine for heading misalignment estimation is depicted in the flow chart of FIG. 5. In this embodiment, the effective frequency characteristic is determined to be a predefined value. Beginning with 500, inertial sensor data for device 100 is obtained from a suitable source, such as inertial sensor 112. In this embodiment, leveled accelerometer data is employed but other sensor measurements, such as gyroscope readings, accelerometer readings, pitch angles or roll angles may be used as desired.

Based on the predefined value of the effective frequency characteristic, a bandwidth for processing the inertial sensor data may be selected in 502. Optionally, as indicated by 504, the selection of which bandwidth may depend in part on a motion mode and/or a use case for device 100, as described above. Notably, the different ways of holding or carrying device 100 may generate different dynamics and signal characteristics. As will be appreciated, this may also include placement of device 100 on the user body. Thus, texting, talking, swinging, carrying device 100 in a pocket or belt clip, as well as any other use cases may influence selection of bandwidth for the filter. Alternatively or in addition, the activity of the user or platform, the motion mode, such as walking, running, cycling, and the like may also influence selection of the appropriate bandwidth.

Next, a band pass filter employing the selected bandwidth may be applied to the inertial sensor data in 506. The use of the band-pass filter in frequency domain may be represented as indicated in Equation 5, in which X($\omega$) and G($\omega$) are the frequency representations of the signal and the band pass filter being used:

$$X_f(\omega) = X(\omega) G(\omega) \quad (5)$$

Correspondingly, the time domain representation of the filtered signal $X_f(\omega)$ may be represented using the Fourier inverse operator as shown in Equation 6:

$$x_f(t) = F^{-1}\{X_f(w)\} \quad (6)$$

Because multiplication in the time domain may be represented by a convolution in time domain, the filtered signal in time domain then may be calculated as indicated in Equation 7:

$$x_f(t) = x(t) * f(t) \quad (7)$$

It will be appreciated that the techniques of this disclosure may include analyzing one or more motion sensor signals to determine the effective frequency characteristic used for artifact reduction. In one embodiment, data of a certain accelerometers axis is used to calculate the motion effective frequency and reconstruct the signal around this frequency in the time domain. As one representative example, the different acceleration signals may be reconstructed using the DC components, real coefficient, and the imaginary coefficient of the effective frequency. The plot diagram of the frequency representation for this example is shown in FIG. 4. Further, the accelerometer and/or gyroscope data may be leveled using an estimated orientation of device 100 to isolate vertical or horizontal components as desired. In 302, a plurality of peaks may be detected in the inertial sensor data. This process may also include discarding misidentified peaks.

As will be appreciated from the above, artifacts in the signal of an inertial sensor, including noise, vibrations, disturbances and the like, may be detected and removed in time and/or frequency domains. Time domain based methods may require less processing time as compared to frequency domain based approaches. Following detection of the dominant and most effective frequency of the measurements, reconstruction of the inertial sensor data may be performed around the detected frequency. Following reconstruction of the signal, a suitable technique may be employed to estimate heading misalignment, such as in the following examples.

Figure 6:
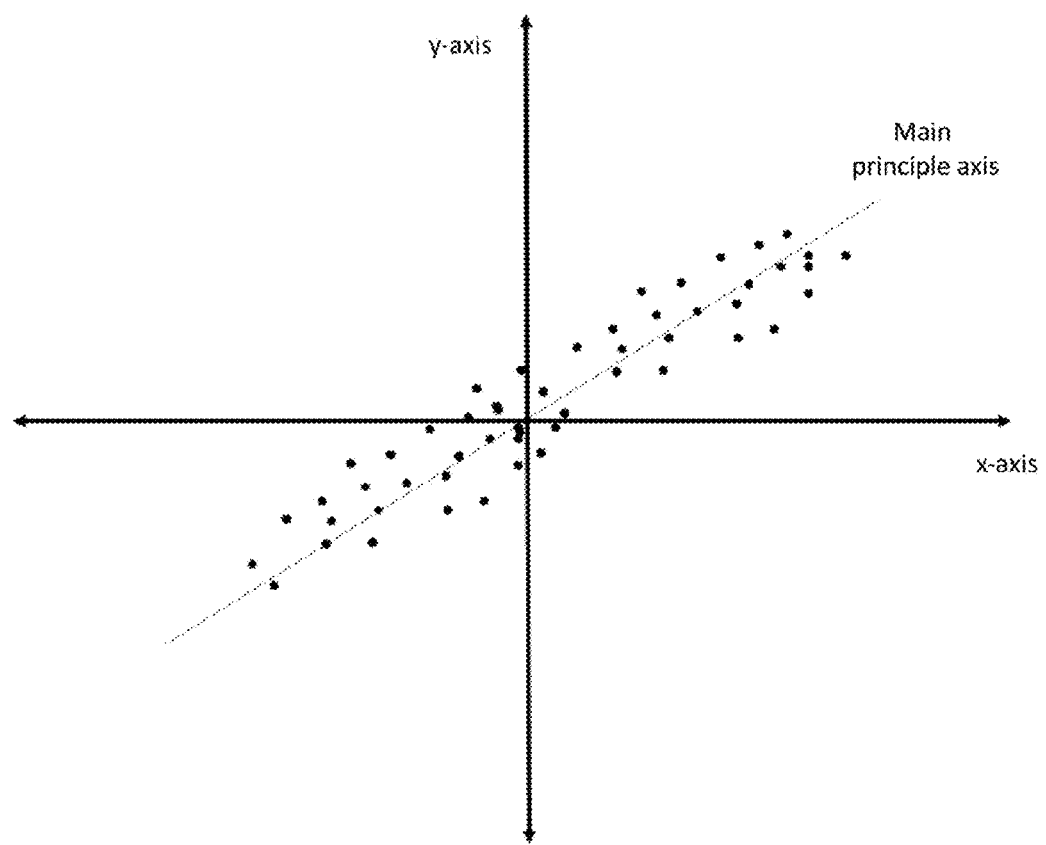
FIG. 6 is a graphical representation of a maximum variance technique for determining an along-track axis according to an embodiment.

A maximum variance analysis between the two leveled horizontal acceleration components may be employed to estimate heading misalignment as depicted in FIG. 6. From a collection of data points, a main principle axis may be identified as shown. In turn, the slope of the axis exhibiting maximum variance represents the heading misalignment angle. For example, this slope can be characterized as an axis where the sum of squared distances between the inertial sensor data and the platform direction axis is minimized. Calculation of this distance may be represented by Equation 8, in which a, b, and c are the coefficients of the line equation ax+by+c=0 and ($x_0$ and $y_0$) are the x-axis and y-axis coordinates respectively of the sensor readings:

$$D = \frac{|ax_0 + by_0 + c|}{\sqrt{(a^2 + b^2)}} \quad (8)$$

The mean value of the data may be subtracted before using the data to calculate the heading misalignment angle, allowing c and b to have the values 0 and −1 respectively, resulting in the simplified version shown in Equation 9:

$$D = \frac{|ax_0 - y_0|}{\sqrt{a^2 + 1}} \quad (9)$$

Figure 7:
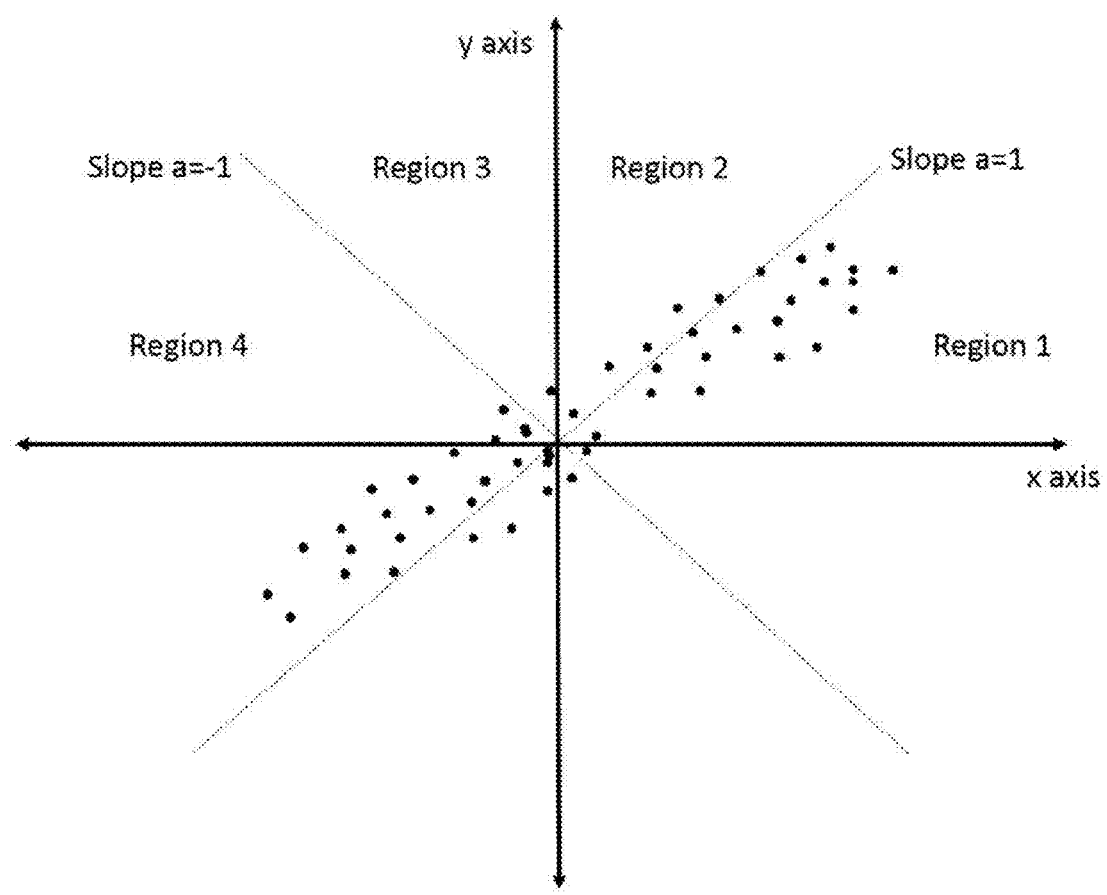
FIG. 7 is a graphical representation of a maximum variance technique for determining an along-track axis using a binary search according to an embodiment.

In one aspect, an iterative binary search technique may be used to find the along-track axis of the platform from the inertial sensor data. During a first iteration, a 180° searching area may be divided into four equal regions (45° each) as shown in FIG. 7. Each subsequent iteration then divides the searching region by 2, resulting in a second searching area range 22.5° and a third searching area range of 11.25° degrees and so forth. Equation 9 may be used to calculate the sum of the squared distances between inertial sensor measurements and the axes of the current iteration, which initially may be the x axis, the y axis, the +1 slope axis, and the −1 slope axis. A first region between the initial axes representing the two minimum sums of squared distances correspondingly contains the principle axis of maximum variance, which may be seen to be Region 1 in this example.

Figure 8:
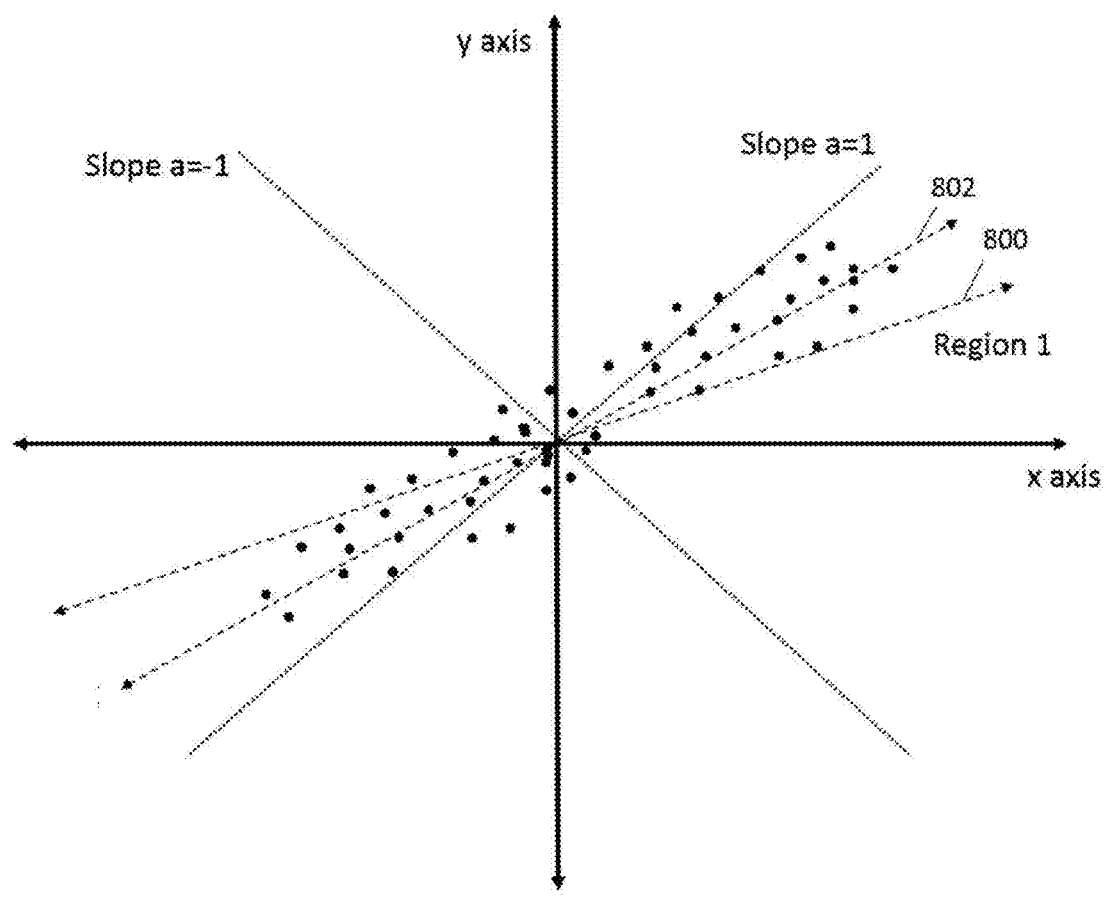
FIG. 8 is a graphical representation of a maximum variance technique for determining an along-track axis of a subsequent iteration of a binary search according to an embodiment.

Upon identification of the first region containing the principle axis, a new axis may be introduced to divide this region in two. The routine iterates as described above, such that a next region between two of the dividing axes representing the two minimum sums of squared distances is identified. This next region is divided again and the routine may be repeated as desired until a sufficient degree of accuracy is achieved. Where n represents is the number of iterations, the accuracy of the calculated direction of the platform along-track axis is $90/(2^n)°$. A further example of this routine is depicted in FIG. 8. Following initial identification of Region 1 as described in reference to FIG. 7, a first new dividing axis 800 is introduced. By computing the minimum sums of the squared distances, the principle axis may be found to lie in the region bounded by the +1 slope axis and dividing axis 800. Correspondingly, a second new axis 802 is introduced to divide this region in two, and the routine repeats as noted.

In one aspect, an analytical technique may be used to find the along-track axis of the platform from the inertial sensor data. The sum of squared distances values, as discussed above, may be expressed as a function of the slope of the along-track axis of the platform. In turn, the along-track axis is the line that represents the absolute minimum value of a calculated first derivative of the sum function. For example, given N readings of the leveled x and y accelerations, a squared distances relationship may be expressed as shown in Equation 10.

$$f(a) = \sum_{i=1}^{N} \frac{(ax_i - y_i)^2}{a^2 + 1} = \sum_{i=1}^{N} \frac{a^2 x_i^2 - 2ax_i y_i + y_i^2}{a^2 + 1} \quad (10)$$

$$f(a) = \frac{a^2 \sum_{i=1}^{N} x_i^2 - 2a \sum_{i=1}^{N} x_i y_i + \sum_{i=1}^{N} y_i^2}{a^2 + 1}$$

$$f(a) = \frac{La^2 - 2Ma + K}{a^2 + 1}$$

where, $$L = \sum_{i=1}^{N} x_i^2,$$

$$M = \sum_{i=1}^{N} x_i y_i,$$

and $$K = \sum_{i=1}^{N} y_i^2$$

Figure 9:
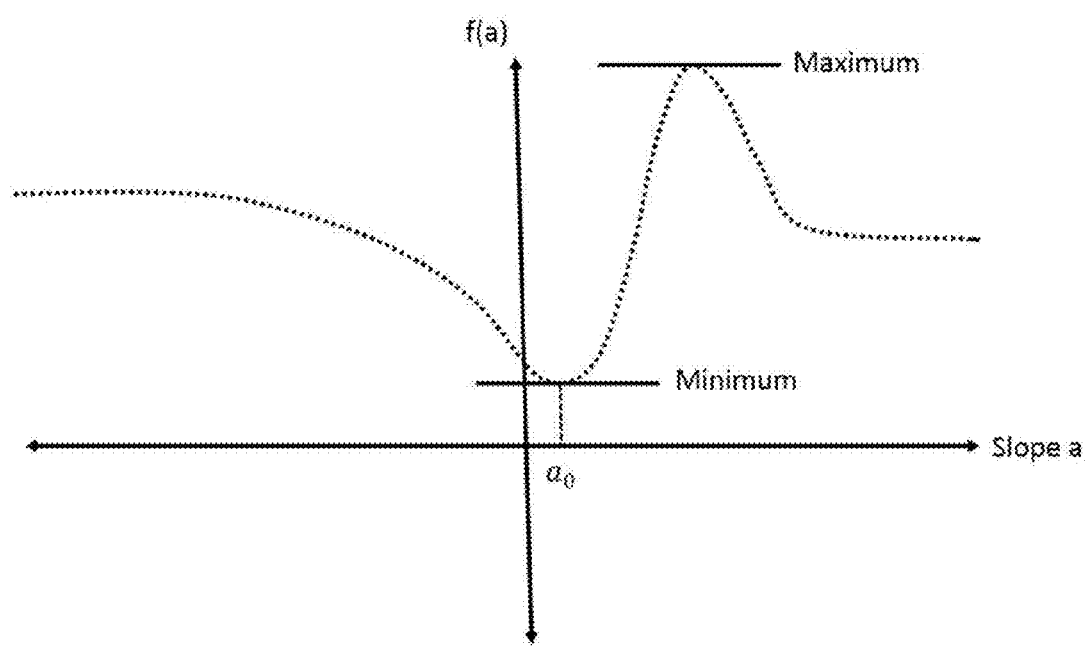
FIG. 9 is a graphical representation of a maximum variance technique for analytically determining an along-track axis using a minimum sum of squared distances according to an embodiment.

To help illustrate, a representative graph of the f(a) function is depicted in FIG. 9, which shows that the slope of the first derivative of the distance function has a value of zero at the absolute minimum of the function.

Accordingly, the first derivative of Equation 10 may be expressed as Equation 11:

$$f(a)' = \frac{(a^2 + 1)(2La - 2M) - (La^2 - 2Ma + K)(2a)}{(a^2 + 1)^2} = \frac{2Ma^2 + 2(L - K)a - 2M}{(a^2 + 1)^2} \quad (11)$$

Further, it will be appreciated that Equation 11 will be equal to zero and therefore Equation 10 will be at the minimum when a has the value given in Equation 12, in which A is equal to M, B is equal to (L−K) and C is equal to −M:

$$a = \frac{-B + \sqrt{B^2 - 4AC}}{2A} \quad (12)$$

In one aspect, a Principle Component Analysis (PCA) technique may be used to find the along-track axis of the platform from the inertial sensor data. Before applying the PCA technique, the horizontal components are generated by leveling the acceleration data to the horizontal plan, then they are fed to the technique. In order to calculate the vector of major axis and minor axis. PCA technique is utilized. PCA is an ordination technique which involves the Eigen-analysis of the data matrix. The data matrix is composed of rows corresponding to observations, and columns to variables. PCA chooses the first PCA axis as the line that minimizes the square of the distance of each point to that line. Equivalently, this line goes through the maximum variation in the data. The first stage in PCA is to standardize the data by subtracting the mean, and then singular value decomposition (SVD) is applied to get the eigenvectors of x-axis and y-axis. The output matrix form the PCA technique contains the information of the misalignment angle. The first column in matrix represents the primary component vector and the second column represents the secondary component vector. It is important to know they are orthogonal vectors. The columns are in order of decreasing component variance. It is worth mentioning that the first value in the primary component vector means what level the x data's contribution is to the primary component vector and the second value means level of y data's contribution to the primary component. The misalignment angle can be determined by calculating the angle using the primary component vector, as shown in Equation (13), where EVx represents the first value in primacy component vector and EVy represents the second value in primary component vector:

$$\theta_{mis} = \tan^{-1}\left(\frac{-EV_y}{EV_x}\right) \quad (13)$$

These and other suitable techniques may be used to determine the along-track axis of the platform to estimate heading misalignment of device 100. As will be appreciated, such estimations may have an ambiguity in that the actual motion of the platform may be in either direction of the along-track axis, and is termed herein the "180° ambiguity." As will be described, parameters that may be employed to resolve this ambiguity include the difference between two angles calculated between vertical and along-track axis accelerations, the phase between vertical and along-track axis accelerations, and the sign of the effective along-track axis acceleration parameters.

Figure 10:
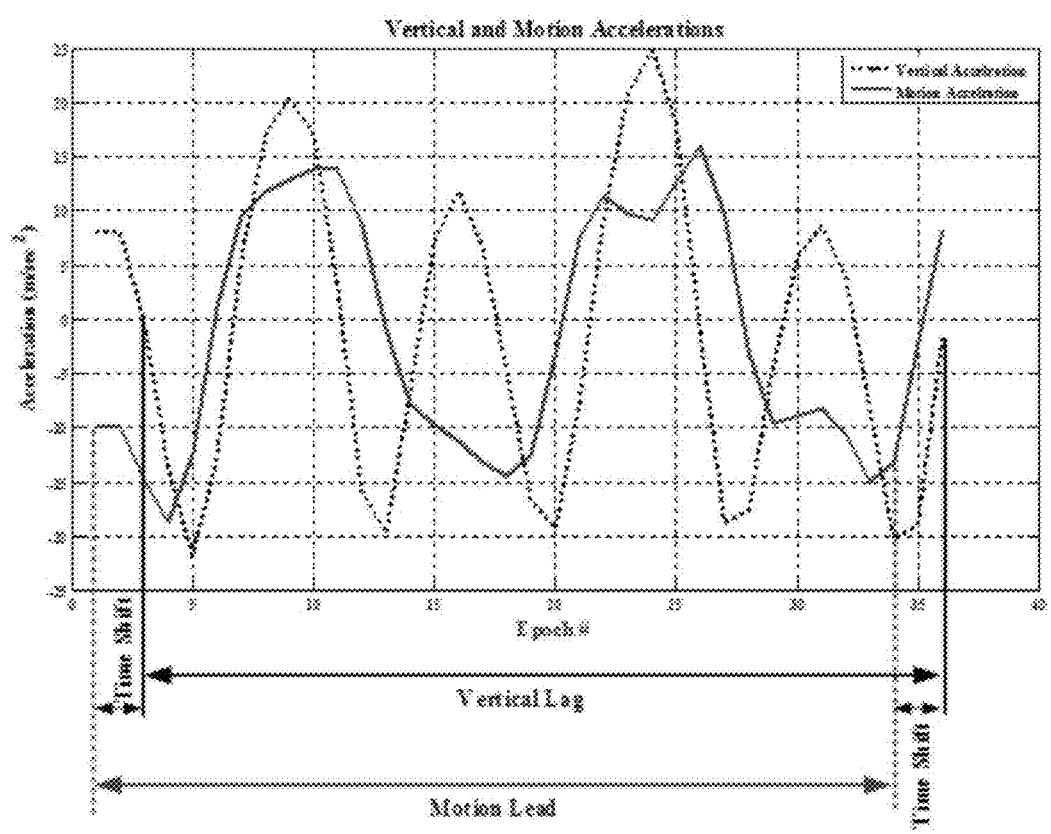
FIG. 10 is a graphical representation of inertial sensor data showing the phase shift between the lagging vertical acceleration signal and the leading along-track axis acceleration signal according to an embodiment.
Figure 11:
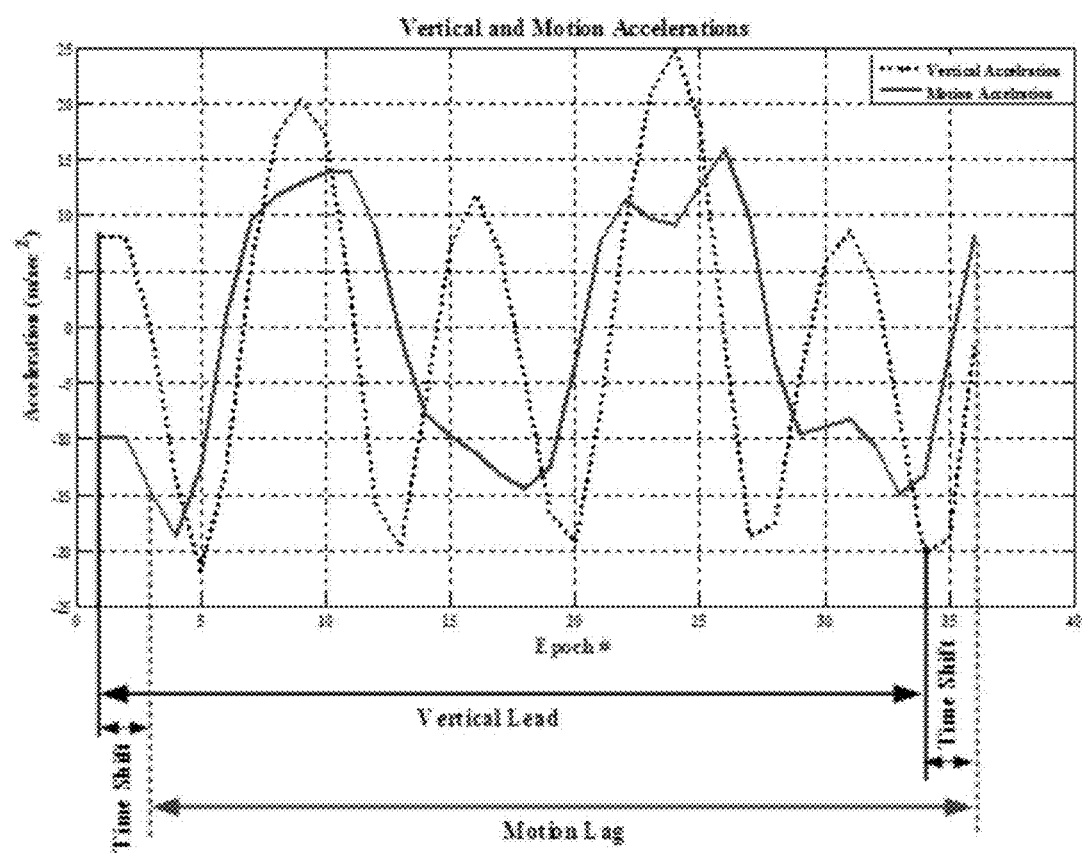
FIG. 11 is a graphical representation of inertial sensor data showing the phase shift between the leading vertical acceleration signal and the lagging along-track axis acceleration signal according to an embodiment.

In one aspect, a technique to assess/resolve the 180° ambiguity is as follows. A first angle may be determined as the phase shift between the lagging vertical acceleration signal and the leading along-track axis acceleration signal as shown in FIG. 10. Further, a second angle may be determined as the phase shift between the leading vertical acceleration signal and the lagging along-track axis acceleration signal as shown in FIG. 11. Correspondingly, the difference between the two angles calculated between the vertical acceleration and the along-track axis acceleration, may be calculated as the difference between the first and second angles. The value of this difference may then be used to determine if the estimated heading misalignment angle is in the correct direction or needs a 180° compensation.

In one aspect, the phase shift between the vertical acceleration and motion direction acceleration may be calculated and used directly to assess/resolve the 180° ambiguity to determine if the estimated heading misalignment angle is in the correct direction or needs a 180° compensation.

In one aspect, a technique to assess/resolve the 180° ambiguity involves determining effective along-track axis acceleration parameters by identifying the parameters having larger values using any maximum variance based technique between the along-track axis acceleration and the vertical acceleration.

In one aspect, the maximum variance between the along-track axis acceleration and the vertical acceleration to resolve the 180° ambiguity may be obtained using a PCA technique. As indicated by Equation 14, the PCA coefficients between the vertical and the along-track axis signals may be calculated:

$$coeff = \begin{bmatrix} c_1 & c_2 \\ c_3 & c_4 \end{bmatrix} \quad (14)$$

One column of coefficients may be selected based on which coefficient of $c_3$ and $c_4$ has the greatest absolute value so that the corresponding coefficient, $c_1$ and $c_2$, respectively, may be used as the effective along-track axis parameter. If the coefficient with the greatest absolute value between $c_3$ and $c_4$ was negative, its column may be multiplied by $-1$. Correspondingly, the value of the effective along-track axis parameter or its average over a certain period of time may be used to determine the ambiguity of the misalignment angle based on its sign and value. Similar PCA techniques may be used to determine the along-track axis as indicated above.

In one aspect, the maximum variance between the along-track axis acceleration and the vertical acceleration to resolve the 180° ambiguity may be obtained using an analytical technique similar to that described in relation to Equations 10-12, to determine the slope a of the principle axis between the vertical acceleration and along-track axis acceleration. Equation 15 relates slope a to the coefficients of the PCA technique:

$$a = \frac{c_3}{c_1} \quad (15)$$

Further, Equation 16 indicates e unity relationship of the PCA coefficients:

$$a = \frac{c_3}{c_1} \quad (16)$$

Therefore, the $c_1$ and $c_3$ coefficients may be expressed in terms of slope a according to Equations 17 and 18, respectively:

$$c_1 = \mp\sqrt{\frac{1}{a^2+1}} \quad (17)$$

$$c_3 = \mp\sqrt{\frac{a^2}{a^2+1}} \quad (18)$$

Depending on the absolute value of the slope (greater or smaller than one) and its sign, Equation 16 or 17 may be selected with the appropriate sign to calculate the effective along-track axis parameter as follows:

If $|a|<1$ & $a \geq 0$, set the effective along-track axis parameter to $$\sqrt{\frac{a^2}{a^2+1}}$$

If |a|<1 & a<0, set the effective along-track axis parameter to $$-\sqrt{\frac{a^2}{a^2+1}}$$

If |a|≥1 & a≥0, set the effective along-track axis parameter to $$\sqrt{\frac{1}{a^2+1}}$$

If |a|≥1 & a<0, set the effective along-track axis parameter to $$-\sqrt{\frac{1}{a^2+1}}$$

In one aspect, the maximum variance between the along-track axis acceleration and the vertical acceleration to resolve the 180° ambiguity may be obtained using a binary search technique as described above.

Results

To help illustrate the techniques of this disclosure, inertial sensor data was obtained for a variety of test trajectories under different motion modes and use cases, including walking and running with different types of portable devices.

Figure 12:
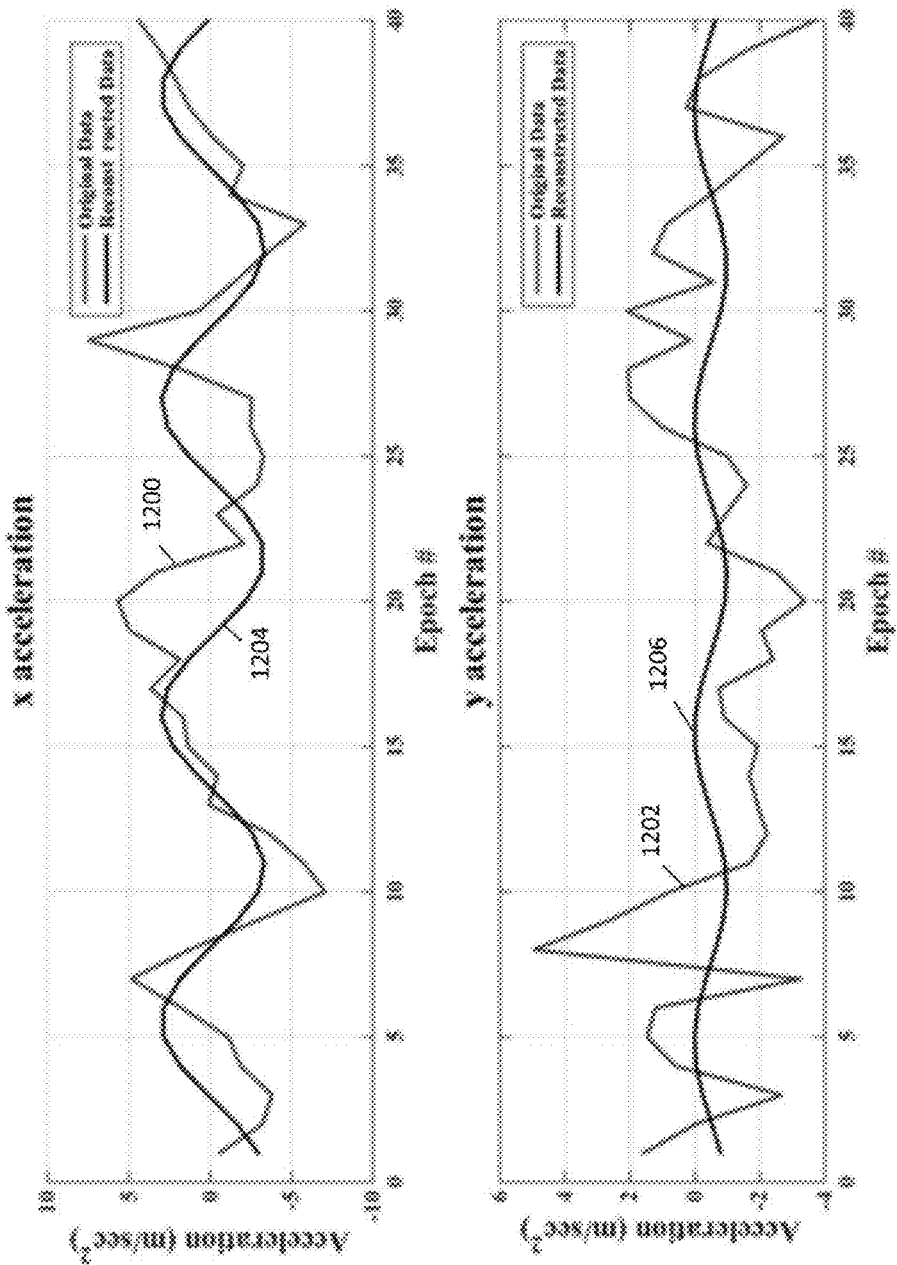
FIG. 12 is a graphical representation of original and reconstructed inertial sensor data in a walking motion mode with a smart phone in a pocket mode use case according to an embodiment.
Figure 13:
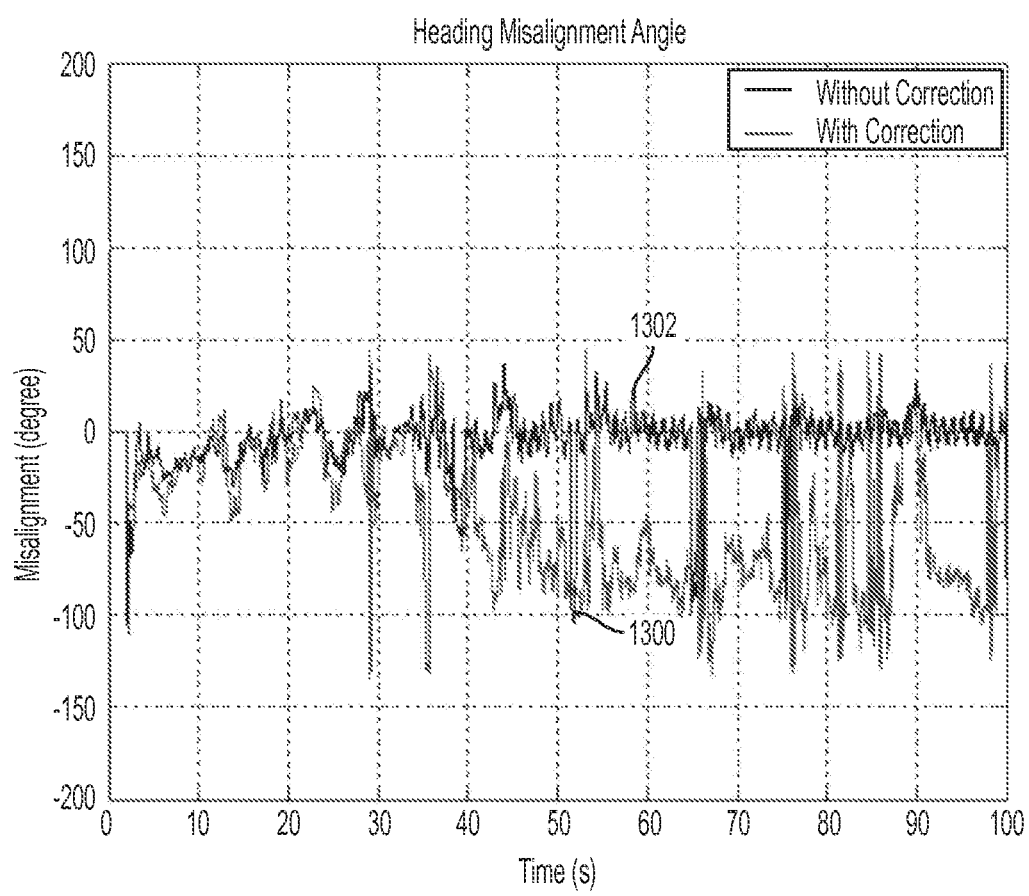
FIG. 13 is a graphical representation of heading misalignment estimation using the original and reconstructed data of FIG. 12 according to an embodiment.

In one example, data was obtained in a walking motion mode with a smart phone in a pocket mode use case, a belt mode use case and an on ear use case. First, as shown in FIG. 12, accelerometer data was obtained over a window of two seconds at a sample rate of twenty Hz for x and y accelerations for the pocket mode use case. Trace 1200 in the top graph shows the original x acceleration data while trace 1202 in the bottom graph shows the original y acceleration data. For comparison, trace 1204 shows the x acceleration data as reconstructed according to the techniques of this disclosure and trace 1206 shows the reconstructed y acceleration data. As can be seen, the reconstructed data is significantly smoother and more clearly exhibits the periodicity associated with the determined effective frequency characteristic. Correspondingly, FIG. 13 illustrates the results of the heading misalignment estimation as performed with the original data in trace 1300 and as performed with the reconstructed data in trace 1302. During the trajectory, the user had the phone in the pant pocket in the vertical direction with the screen facing the body and the speaker pointed up at the left side of the body. Thus, the heading misalignment should be around 0 degrees. As shown, the heading misalignment estimation using the original data resulted in an approximately 70 to 90 degrees error attributable to the vibration and high noise level causing artifacts, while use of the reconstructed data provides a much more accurate estimation.

Figure 14:
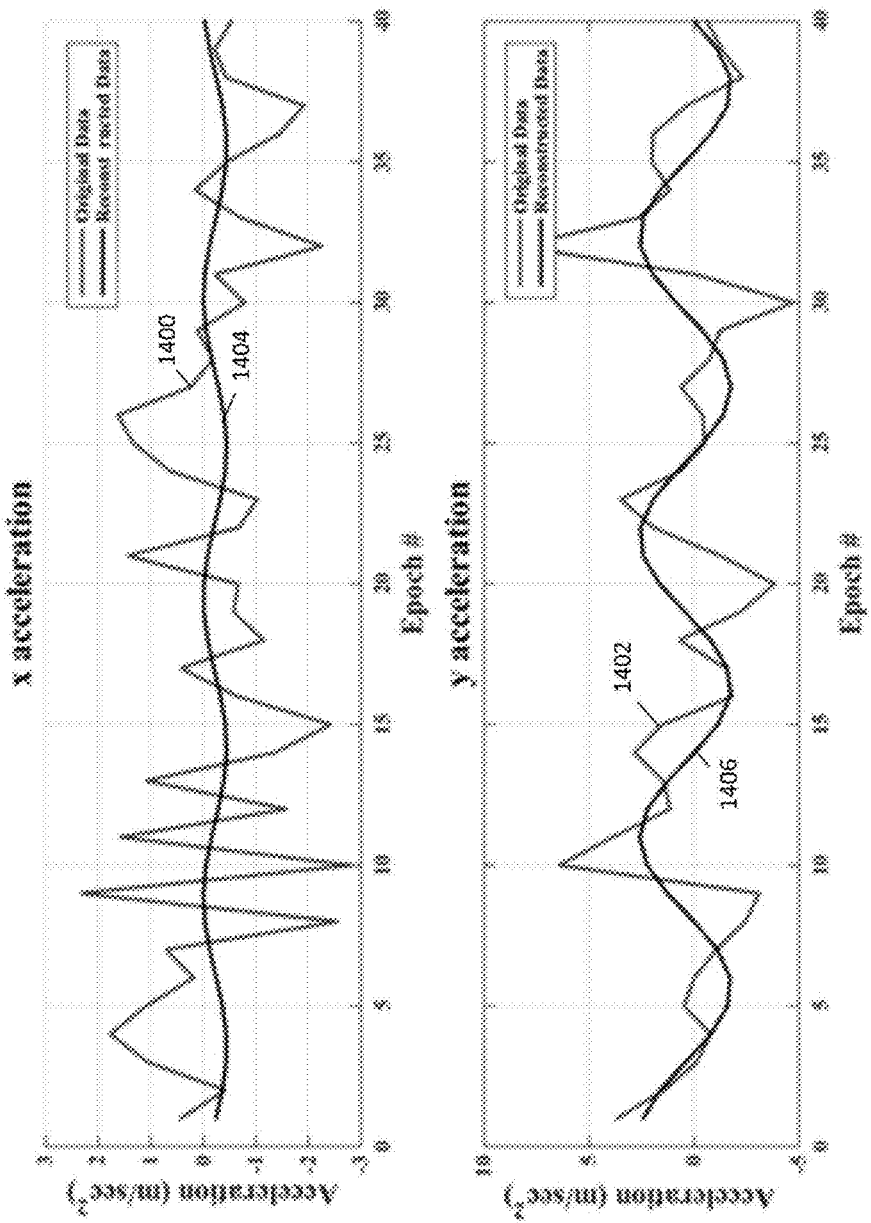
FIG. 14 is a graphical representation of original and reconstructed inertial sensor data in a walking motion mode with a smart phone in a belt mode use case according to an embodiment.
Figure 15:
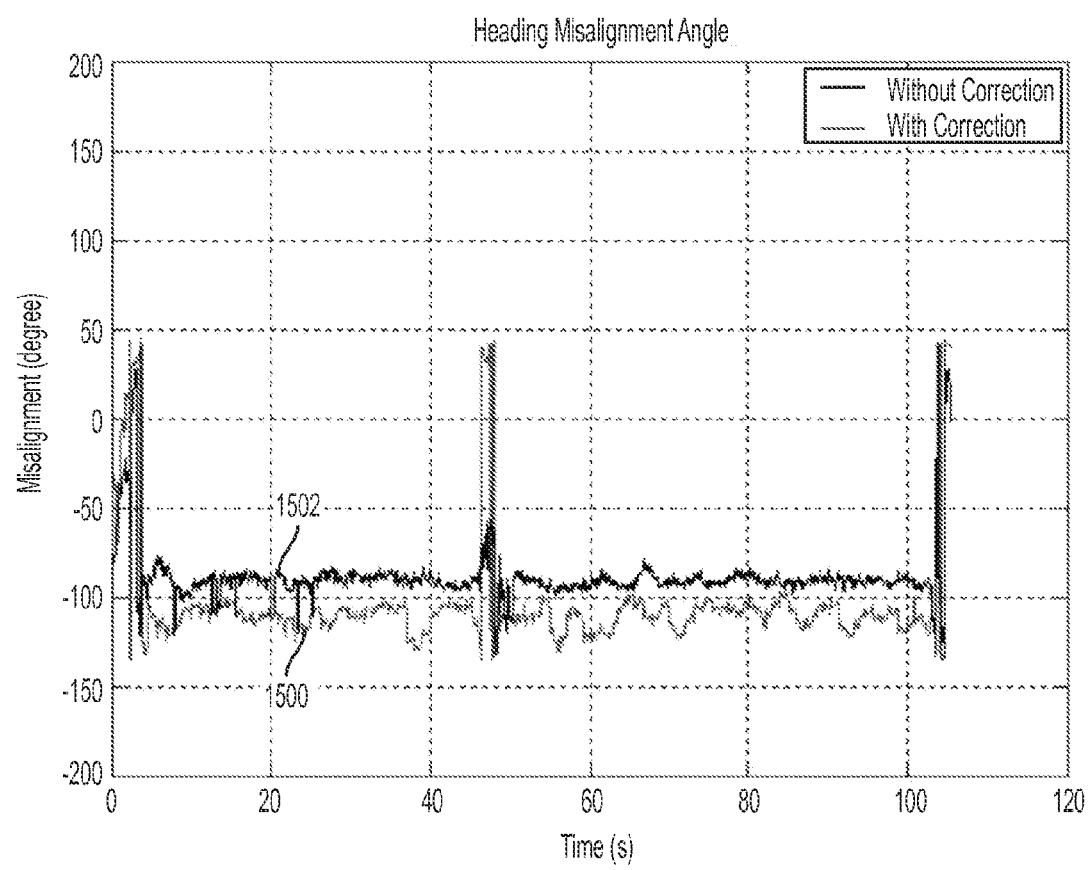
FIG. 15 is a graphical representation of heading misalignment estimation using the original and reconstructed data of FIG. 14 according to an embodiment.

Next, similar test conditions were used to record data for a belt mode use case. The original accelerometer data is represented by traces 1400 and 1402 and the reconstructed data is represented by traces 1404 and 1406 in FIG. 14. Again, the reconstructed data is much cleaner and the periodicity associated with the effective frequency characteristic is readily appreciated. The corresponding heading misalignment estimations are shown in FIG. 15, with trace 1500 representing the estimation performed using the original data and trace 1502 representing the estimation performed using the reconstructed data. Here, the phone was tethered to a belt in the vertical direction with screen facing out from the body and the speaker pointed up at the right side of the body and therefore should have a heading misalignment of around negative 90 degrees. Again, use of the reconstructed data provides a more accurate heading misalignment estimation.

Figure 16:
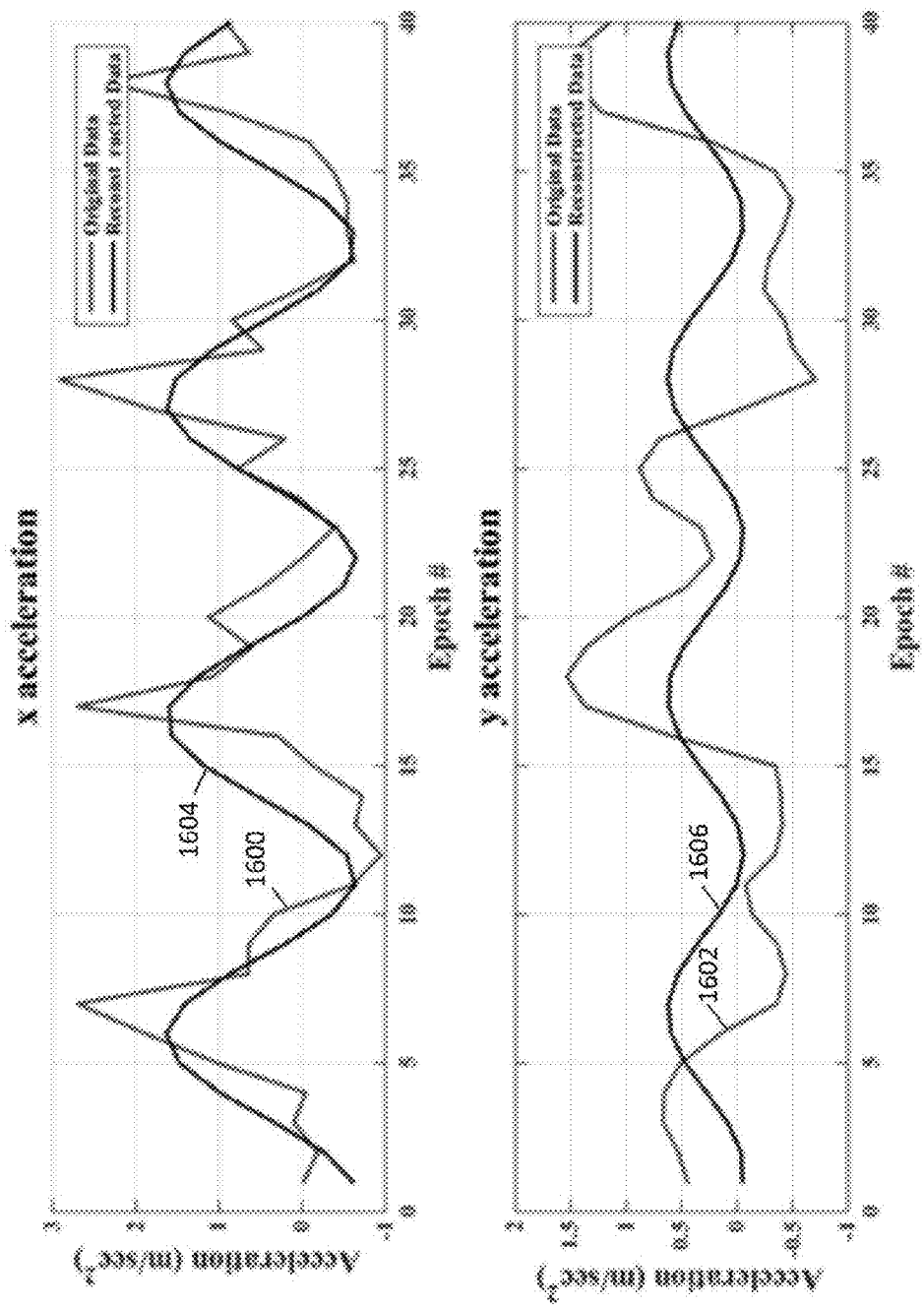
FIG. 16 is a graphical representation of original and reconstructed inertial sensor data in a walking motion mode with a smart phone in a on ear use case according to an embodiment.
Figure 17:
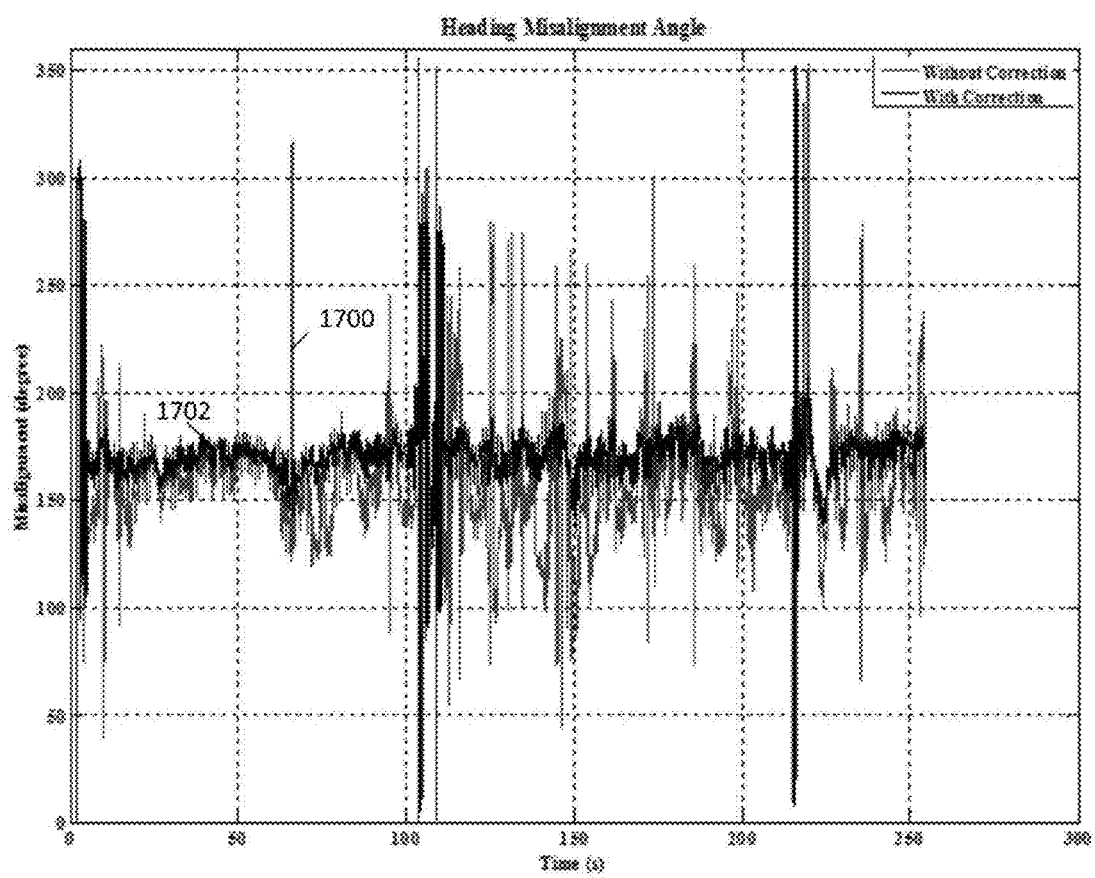
FIG. 17 is a graphical representation of heading misalignment estimation using the original and reconstructed data of FIG. 16 according to an embodiment.

Finally, the test was conducted for an on ear use case, while the user was talking on the phone. The original accelerometer data is represented by trace 1600 and 1602 and the reconstructed data is represented by traces 1604 and 1606 in FIG. 16 showing similar improvements in quality for the reconstructed data as described above. As shown in FIG. 17, the heading misalignment estimations performed using the original data are represented by trace 1700 and the estimation performed using the reconstructed data represented by trace 1702. During the trajectory, the expected heading misalignment was about 180 degrees as the phone was on the right side ear for talking with the screen facing the body and the speaker pointed to the backward direction. As demonstrated in FIG. 16, the original data was very noisy as may be expected for this use case since holding the phone to the ear with the hand is relatively shaky and loose, resulting in significant vibration and other artifacts in the inertial sensor measurements. This is reflected in the significant errors in the estimation performed using the original data as shown in FIG. 17.

Figure 18:
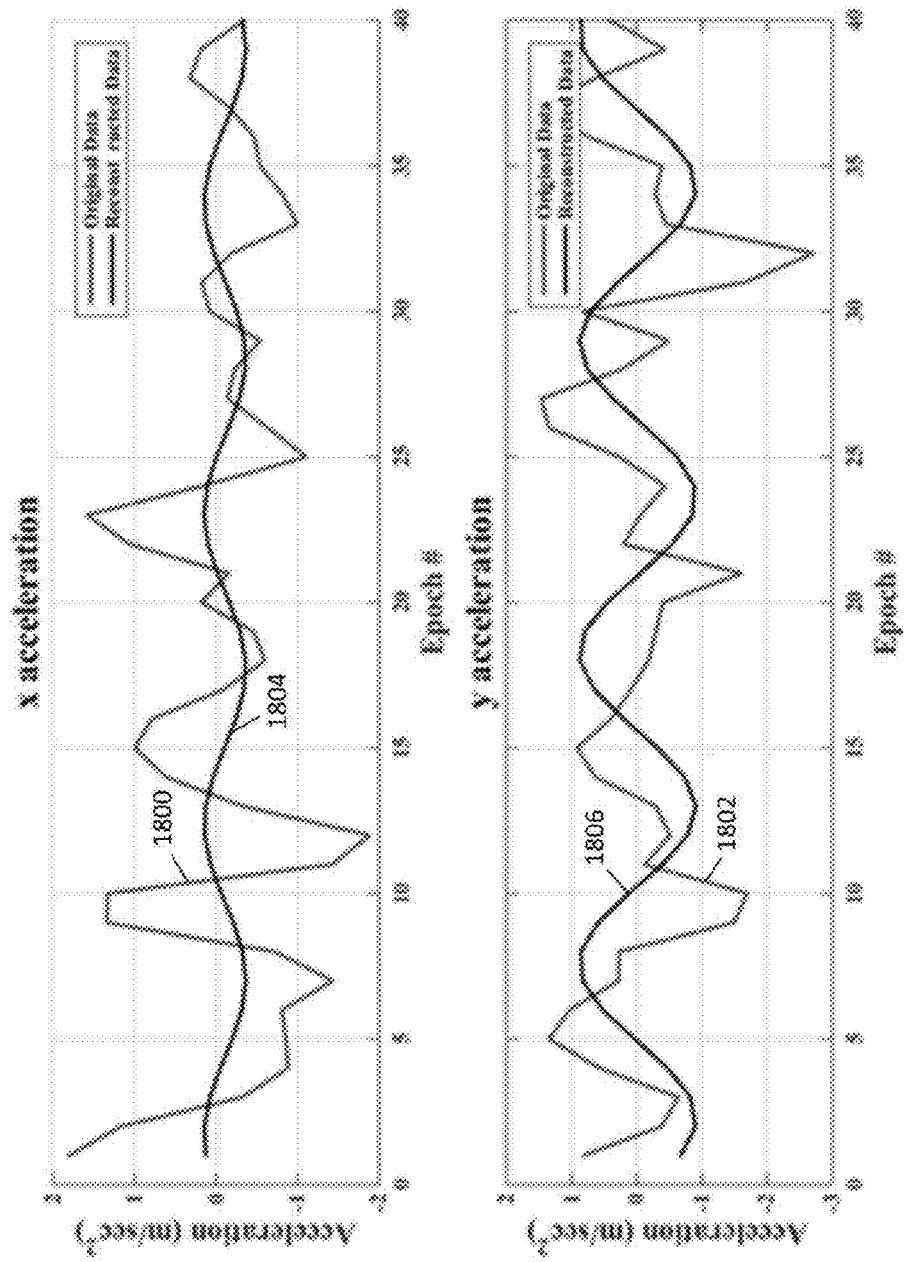
FIG. 18 is a graphical representation of original and reconstructed inertial sensor data in a walking motion mode with a tablet in a reading use case according to an embodiment.
Figure 19:
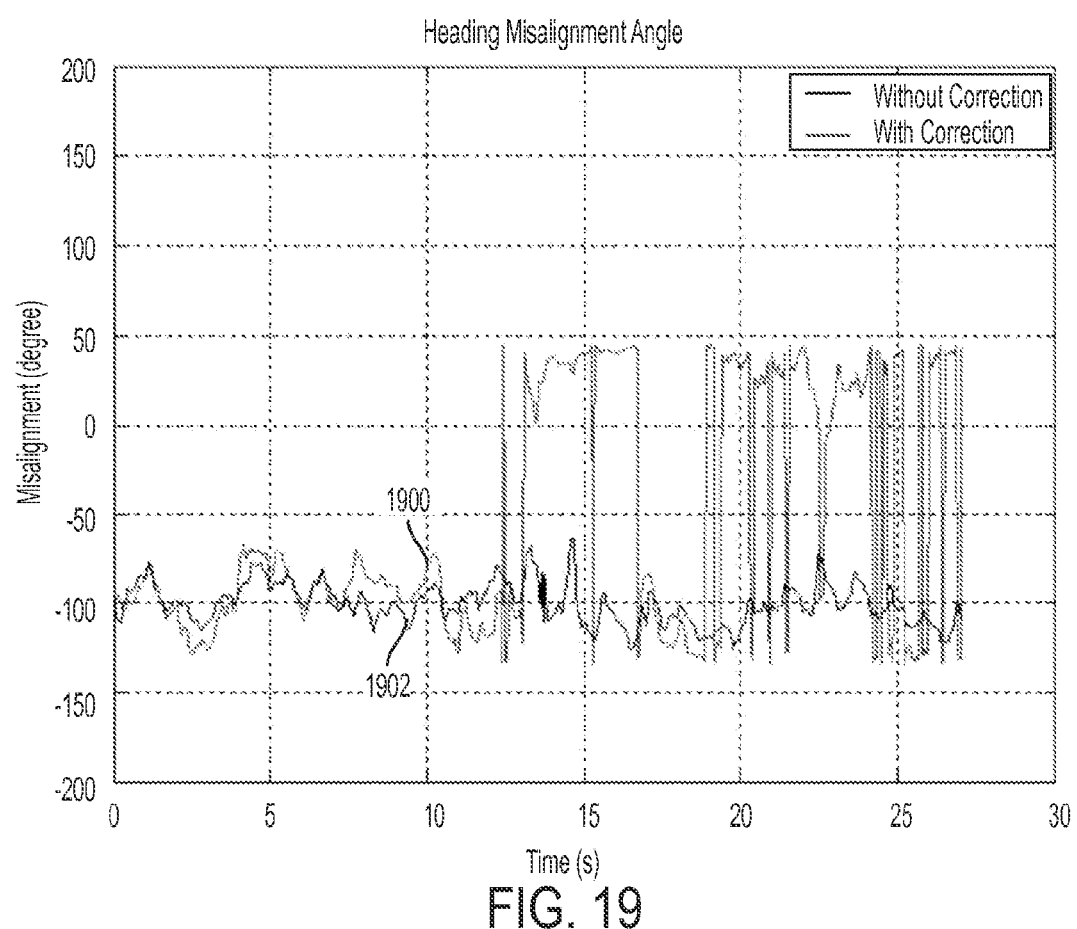
FIG. 19 is a graphical representation of heading misalignment estimation using the original and reconstructed data of FIG. 18 according to an embodiment.

In another example, data was obtained in a walking motion mode with a tablet in a reading mode use case. As shown in FIG. 18, accelerometer data was obtained over a window of two seconds at a sample rate of twenty Hz for x and y accelerations. Trace 1800 in the top graph shows the original x acceleration data while trace 1802 in the bottom graph shows the original y acceleration data. For comparison, trace 1804 shows the x acceleration data as reconstructed according to the techniques of this disclosure and trace 1806 shows the reconstructed y acceleration data. Once again, the reconstructed data is significantly smoother and more clearly exhibits the periodicity associated with the determined effective frequency characteristic. In turn, FIG. 19 shows the heading misalignment estimation results as performed with the original data in trace 1900 and with the reconstructed data in trace 1902. During the trajectory, the user held the tablet with both hands in the reading mode with camera at the left direction, leading to an expected heading misalignment of about negative 100 degrees. As shown, the heading misalignment estimation using the reconstructed data resulted in a stable and accurate estimation while the original data resulted in significant errors, particularly in the second half of the test window.

Figure 20:
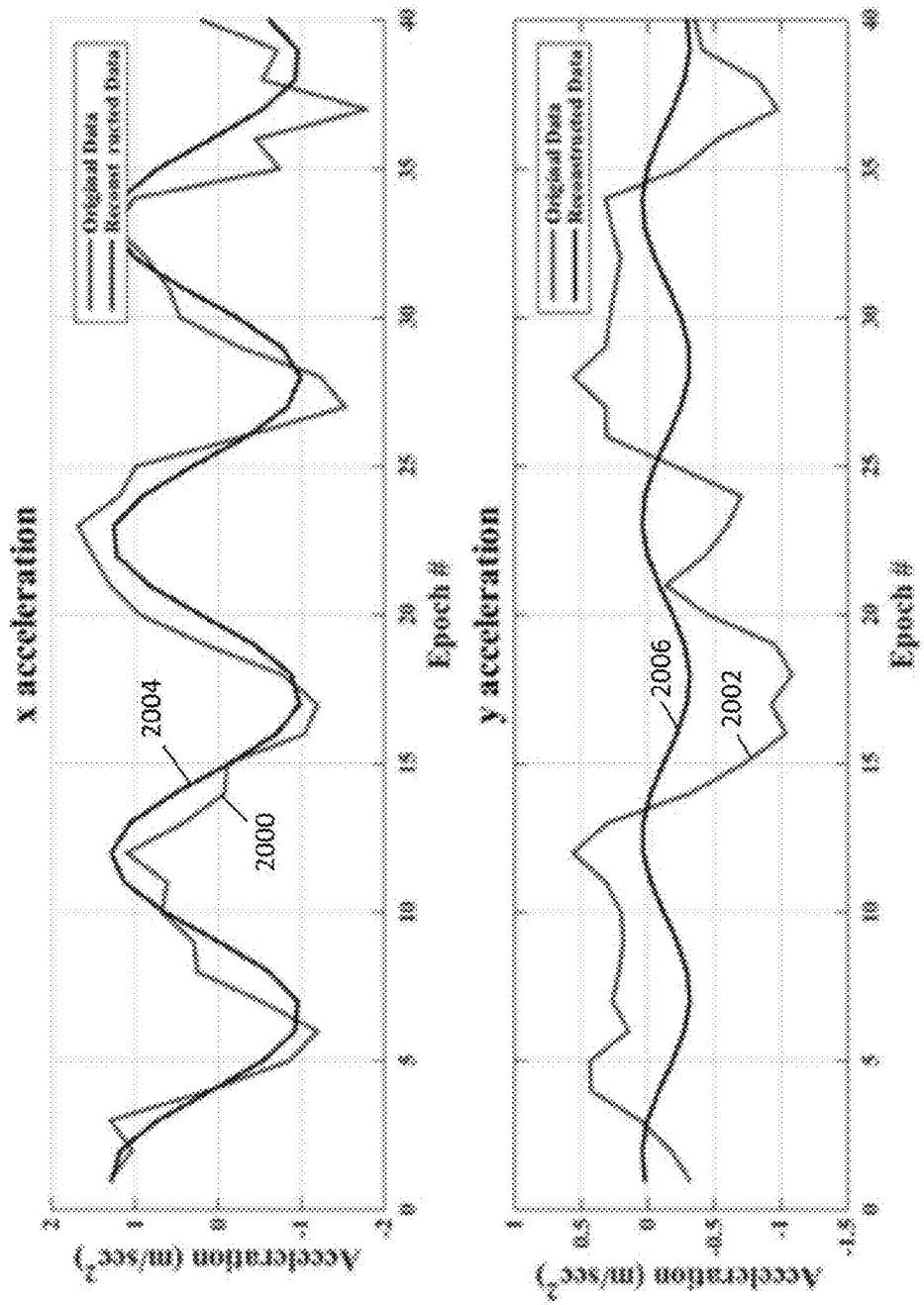
FIG. 20 is a graphical representation of original and reconstructed inertial sensor data in a walking motion mode with a smart watch in a wrist mode use case according to an embodiment.
Figure 21:
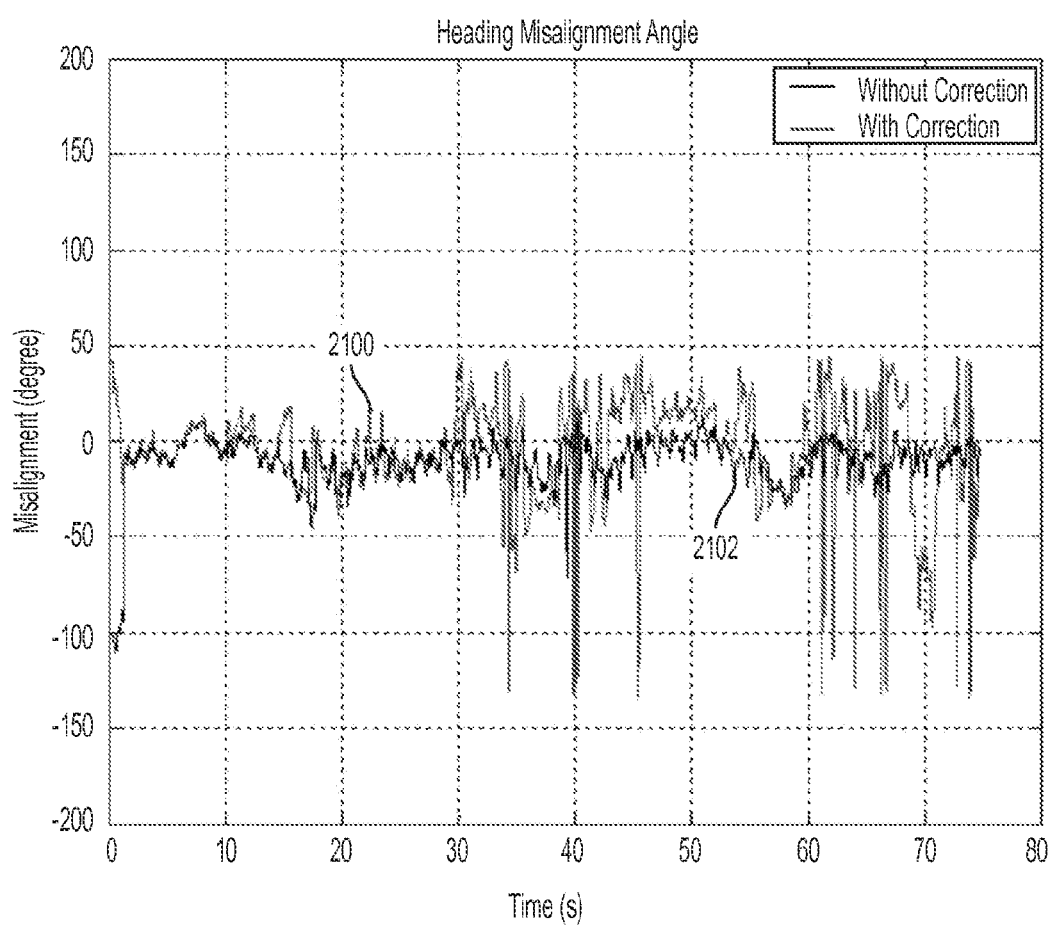
FIG. 21 is a graphical representation of heading misalignment estimation using the original and reconstructed data of FIG. 20 according to an embodiment.

In yet another example, data was obtained in a walking motion mode with a smart watch in its corresponding wrist mode use case. As shown in FIG. 20, accelerometer data was obtained over a window of two seconds at a sample rate of twenty Hz for x and y accelerations. Trace 2000 in the top graph shows the original x acceleration data while trace 2002 in the bottom graph shows the original y acceleration data. For comparison, trace 2004 shows the x acceleration data as reconstructed according to the techniques of this disclosure and trace 2006 shows the reconstructed y acceleration data. As with the other examples, the reconstructed data is significantly smoother and more clearly exhibits the periodicity associated with the determined effective frequency characteristic. Next, FIG. 21 shows the heading misalignment estimation results as performed with the original data in trace 2100 and with the reconstructed data in trace 2102. In this test, the watch was worn while simultaneously making call with a phone, resulting in the user's hand being positioned by the head with an expected heading misalignment of about 0 degrees. As with the smartphone in the on ear use case, the user's hand is expected to be shaky with hand movements causing significant artifacts in the inertial sensor data. The effect of these perturbing signals appears clearly in the estimated heading misalignment angle using the original data as compared to estimation performed with the reconstructed data.

Figure 22:
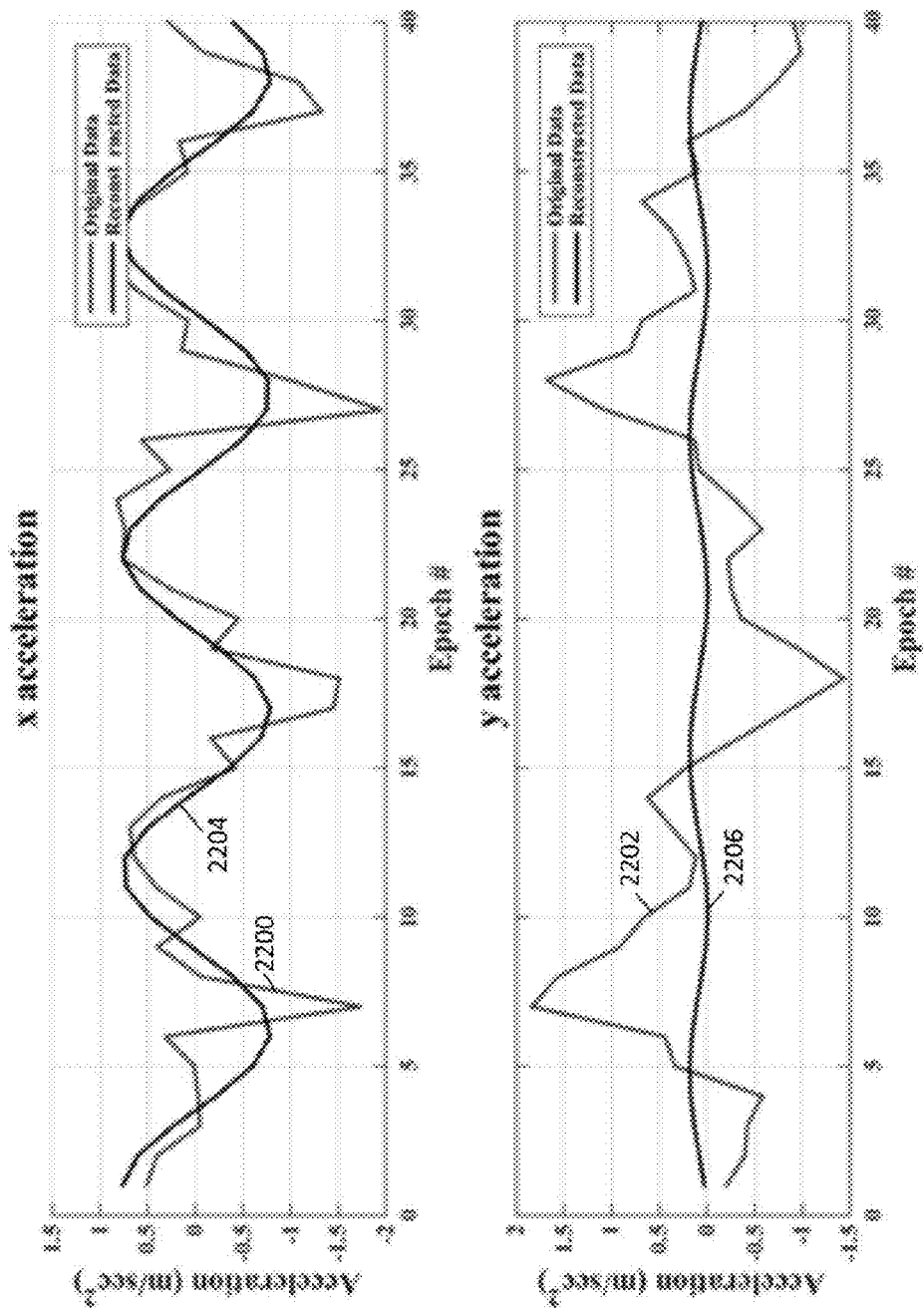
FIG. 22 is a graphical representation of original and reconstructed inertial sensor data in a walking motion mode with smart glasses in an on thee use case according to an embodiment.
Figure 23:
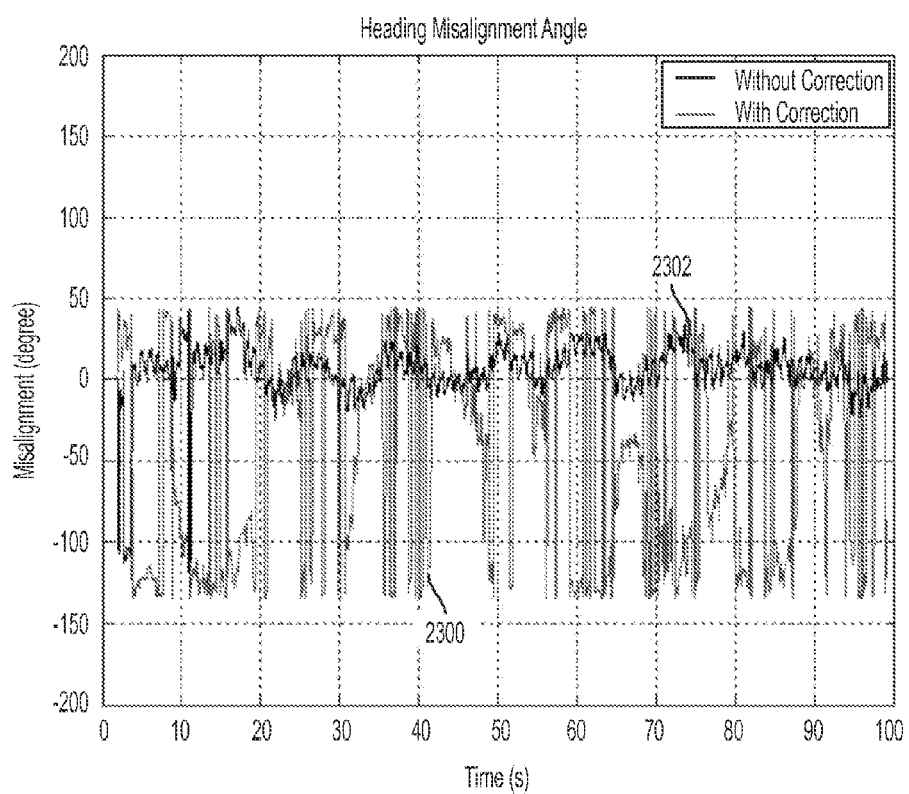
FIG. 23 is a graphical representation of heading misalignment estimation using the original and reconstructed data of FIG. 22 according to an embodiment.

In still another example, data was obtained in a walking motion mode with smart glasses in an "on face" use case. As shown in FIG. 22, accelerometer data was obtained over a window of two seconds at a sample rate of twenty Hz for x and y accelerations. Trace 2200 in the top graph shows the original x acceleration data while trace 2202 in the bottom graph shows the original y acceleration data while trace 2204 shows the x acceleration data as reconstructed according to the techniques of this disclosure and trace 2206 shows the reconstructed y acceleration data. Here also, the quality of the reconstructed data is improved. The heading misalignment estimations using this data are shown in FIG. 23, with the original data resulting in trace 2300 and the reconstructed data resulting in trace 2302. The expected heading misalignment is between −10 and 10 degrees, as a range of head movement naturally occurs. As can be seen, signals from smart glasses sensors represent a challenging analysis due to relatively constant conscious and unconscious head movement. Correspondingly, the estimation performed using the reconstructed data may be seen as a significant improvement by generating a substantially stable misalignment angle in the expected range as compared to the very inconsistent and widely variable estimations obtained using the original data.

Figure 24:
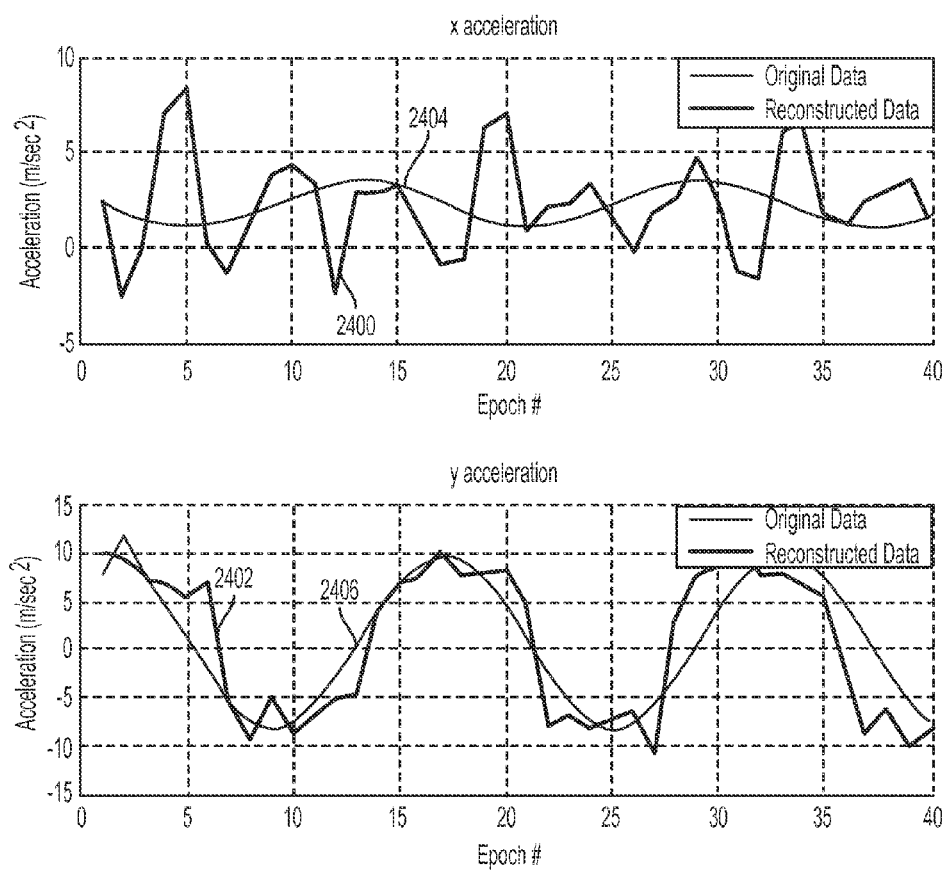
FIG. 24 is a graphical representation of original and reconstructed inertial sensor data in a running motion mode with a smart phone in an arm mounted mode use case according to an embodiment.
Figure 25:
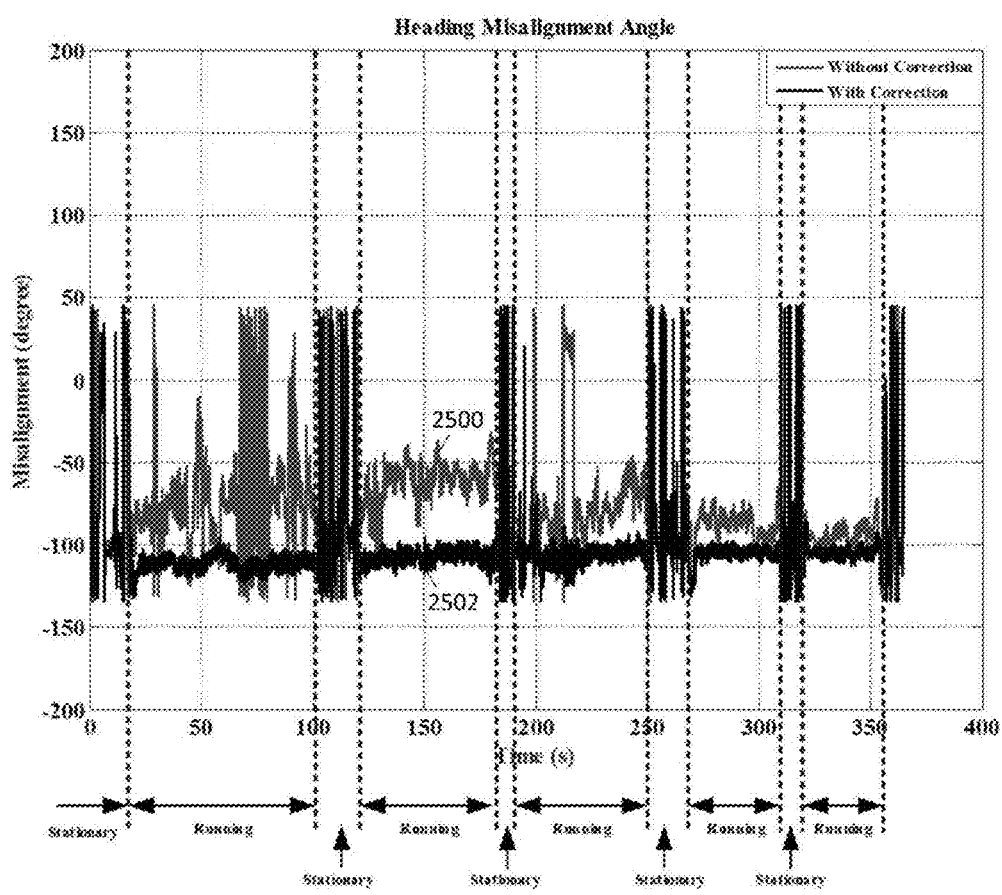
FIG. 25 is a graphical representation of heading misalignment estimation using the original and reconstructed data of FIG. 24 according to an embodiment.

In another example, data was obtained in a running motion mode with a smart phone in an arm mounted use case, a pocket mode use case, a chest mounted use case and a leg mounted use case. First, with respect to arm use case, FIG. 24 shows accelerometer data obtained over a window of two seconds at a sample rate of twenty Hz for x and y accelerations. Trace 2400 in the top graph shows the original x acceleration data while trace 2402 in the bottom graph shows the original y acceleration data while trace 2404 shows the x acceleration data as reconstructed according to the techniques of this disclosure and trace 2406 shows the reconstructed y acceleration data. As in the other examples, the quality of the reconstructed data is improved. The heading misalignment estimations using this data are shown in FIG. 25, with the original data resulting in trace 2500 and the reconstructed data resulting in trace 2502. During this trajectory, the phone was affixed to the user's left arm with the screen facing to the body and the speaker pointed up with an expected heading misalignment of around negative 110 degrees. Each successive running period represents a faster speed. As shown, a more accurate estimation may be performed when using the reconstructed data instead of the original data. Further, the influence of using the determined effective frequency characteristic is demonstrated by a comparison between the indicated running periods. While running, the effective frequency characteristic is available to reduce artifacts in the signal, resulting in a stable and accurate estimation. Greater improvement may be observed at slower running speeds, in part because the more exaggerated movements associated with faster speeds tend to provide a stronger inertial sensor signal, reducing the influence of the artifacts in the original data when performing the estimation.

Figure 26:
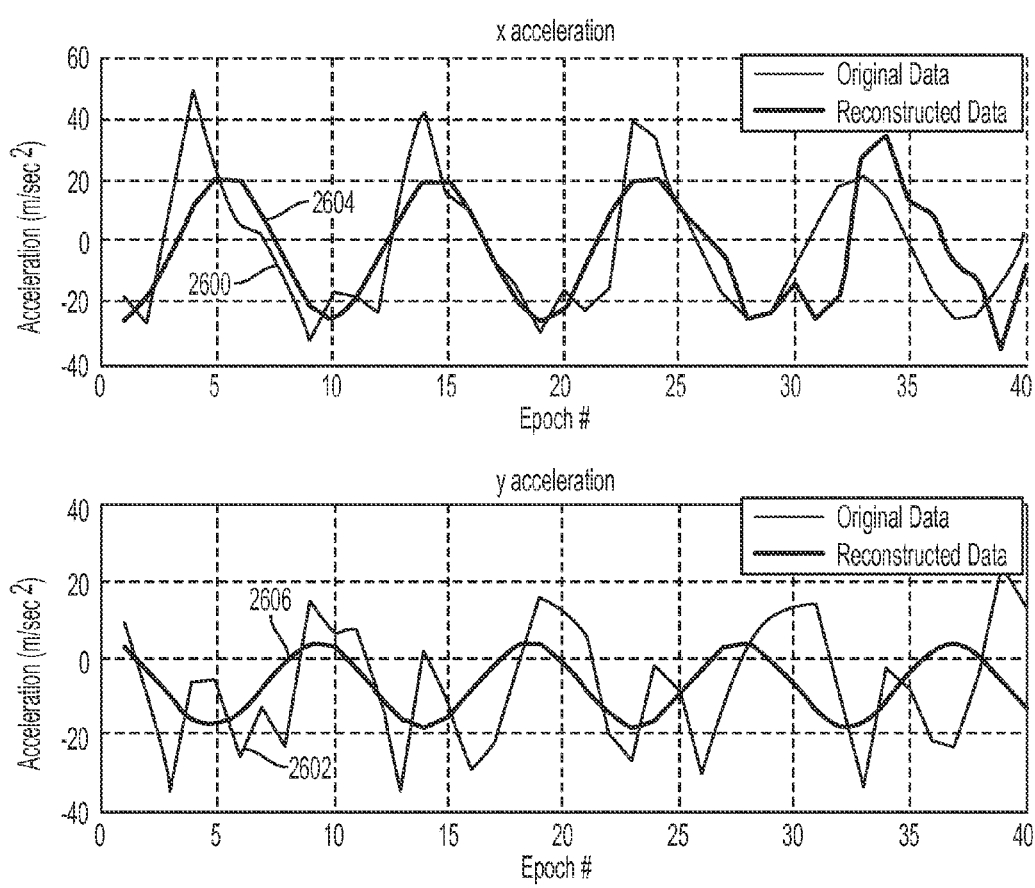
FIG. 26 is a graphical representation of original and reconstructed inertial sensor data in a running motion mode with a smart phone in pocket mode use case according to an embodiment.
Figure 27:
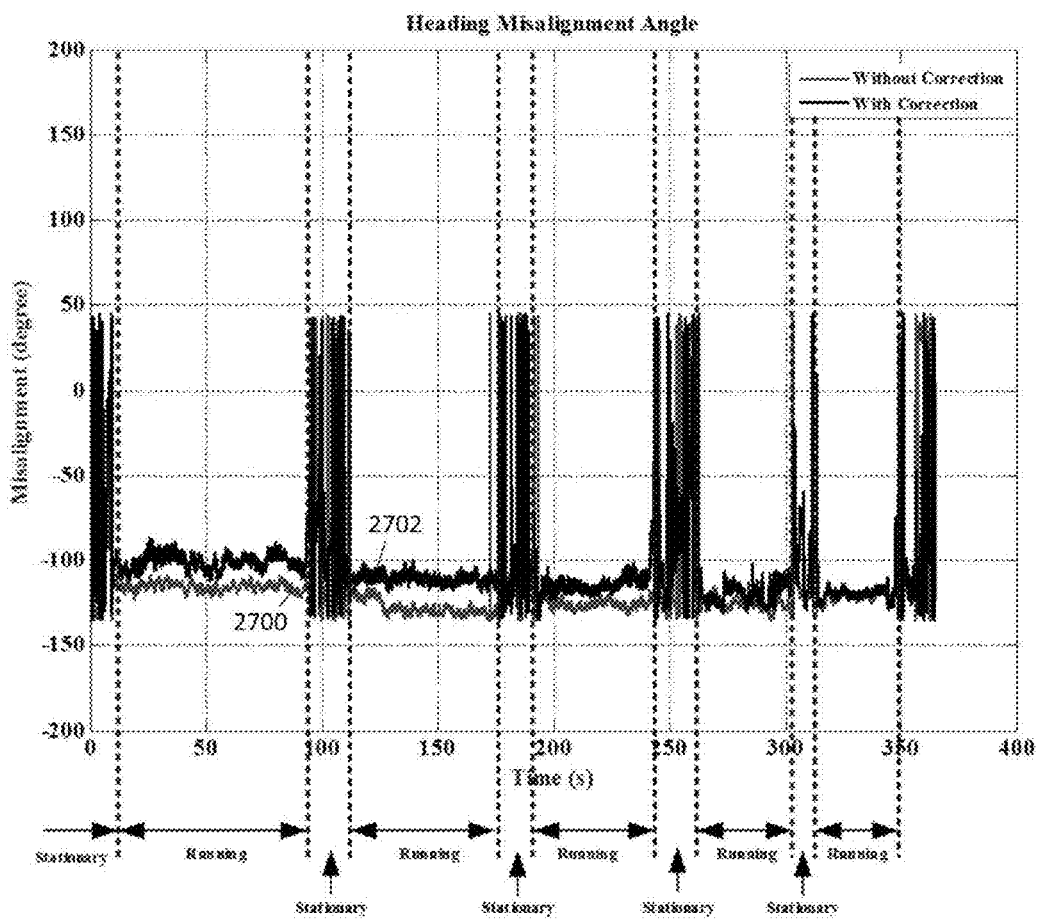
FIG. 27 is a graphical representation of heading misalignment estimation using the original and reconstructed data of FIG. 26 according to an embodiment.

Next, similar test conditions were used to record data for a pocket mode use case. As shown in FIG. 26, the original accelerometer data is represented by traces 2600 and 2602 and the reconstructed data is represented by traces 2604 and 2606. Again, the reconstructed data is much cleaner and the periodicity associated with the effective frequency characteristic is readily appreciated. The corresponding heading misalignment estimations are shown in FIG. 27, with trace 2700 representing the estimation performed using the original data and trace 2702 representing the estimation performed using the reconstructed data. Each successive running period represents a faster speed. Here, the phone was positioned in a pocket with the screen facing towards the body and the speaker to the left with an expected heading misalignment of around negative 95 degrees. As can be seen, use of the reconstructed data provides a more accurate heading misalignment estimation, as demonstrated during the periods of running when the effective frequency characteristic may be determined and used to reduce artifacts in the inertial sensor data according to the techniques of this disclosure.

Figure 28:
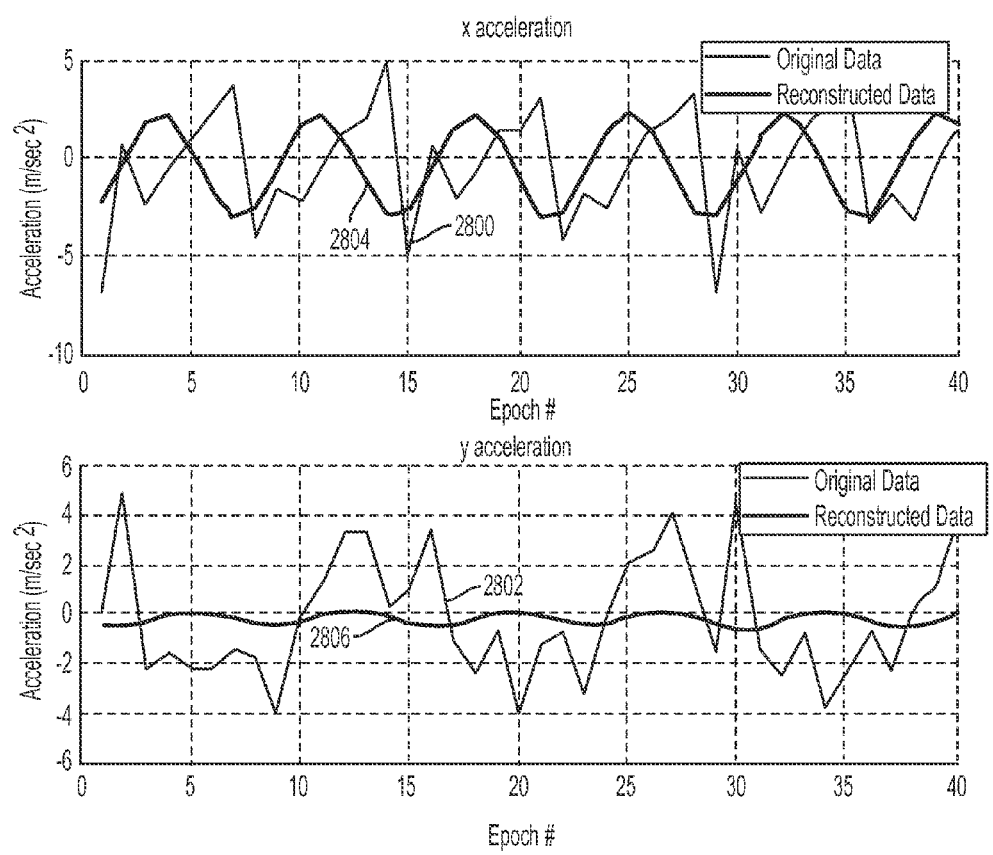
FIG. 28 is a graphical representation of original and reconstructed inertial sensor data in a running motion mode with a smart phone in a chest mounted mode use case according to an embodiment.
Figure 29:
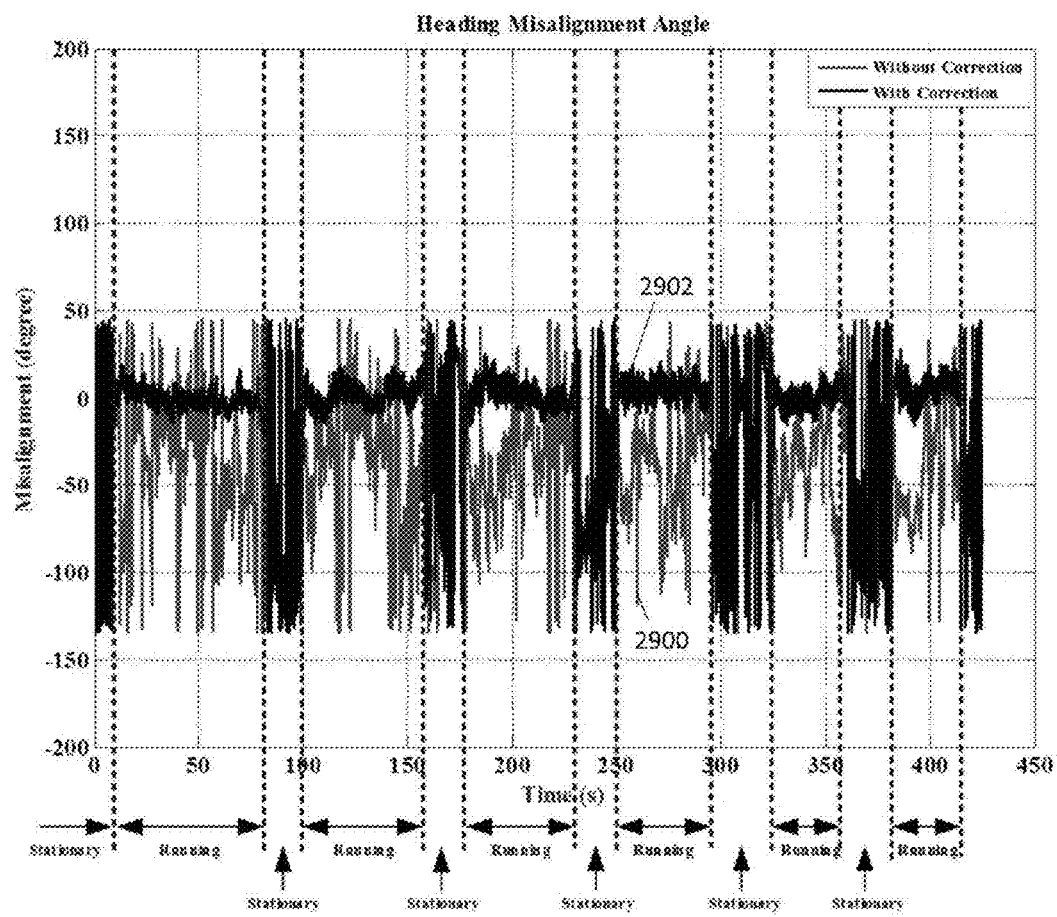
FIG. 29 is a graphical representation of heading misalignment estimation using the original and reconstructed data of FIG. 28 according to an embodiment.

These test conditions were also used to record data for a chest mode use case as shown in FIG. 28. The original accelerometer data is represented by traces 2800 and 2802 and the reconstructed data is represented by traces 2804 and 2806, demonstrating the improvements associated with these techniques. The corresponding heading misalignment estimations are shown in FIG. 29, with trace 2900 representing the estimation performed using the original data and trace 2902 representing the estimation performed using the reconstructed data and each successive running period representing a faster speed. Each successive running period represents a faster speed. Here, the phone was secured with a chest strap so that the screen faced the body and the speaker pointed up having an expected heading misalignment of around 0 degrees. As shown, the estimated heading misalignment values are very noisy when the original data is employed and a much smoother and accurate estimation is obtained with the reconstructed data.

Figure 30:
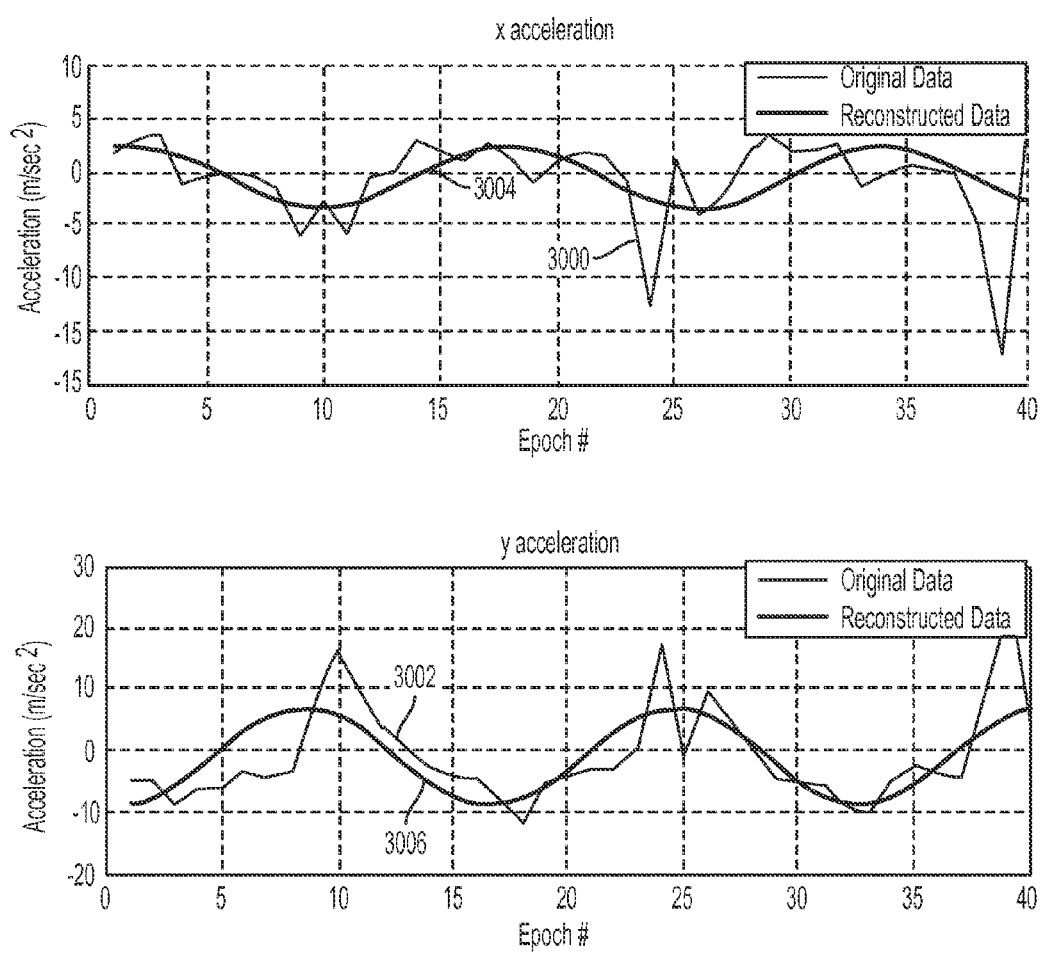
FIG. 30 is a graphical representation of original and reconstructed inertial sensor data in a running motion mode with a smart phone in a leg mounted mode use case according to an embodiment.
Figure 31:
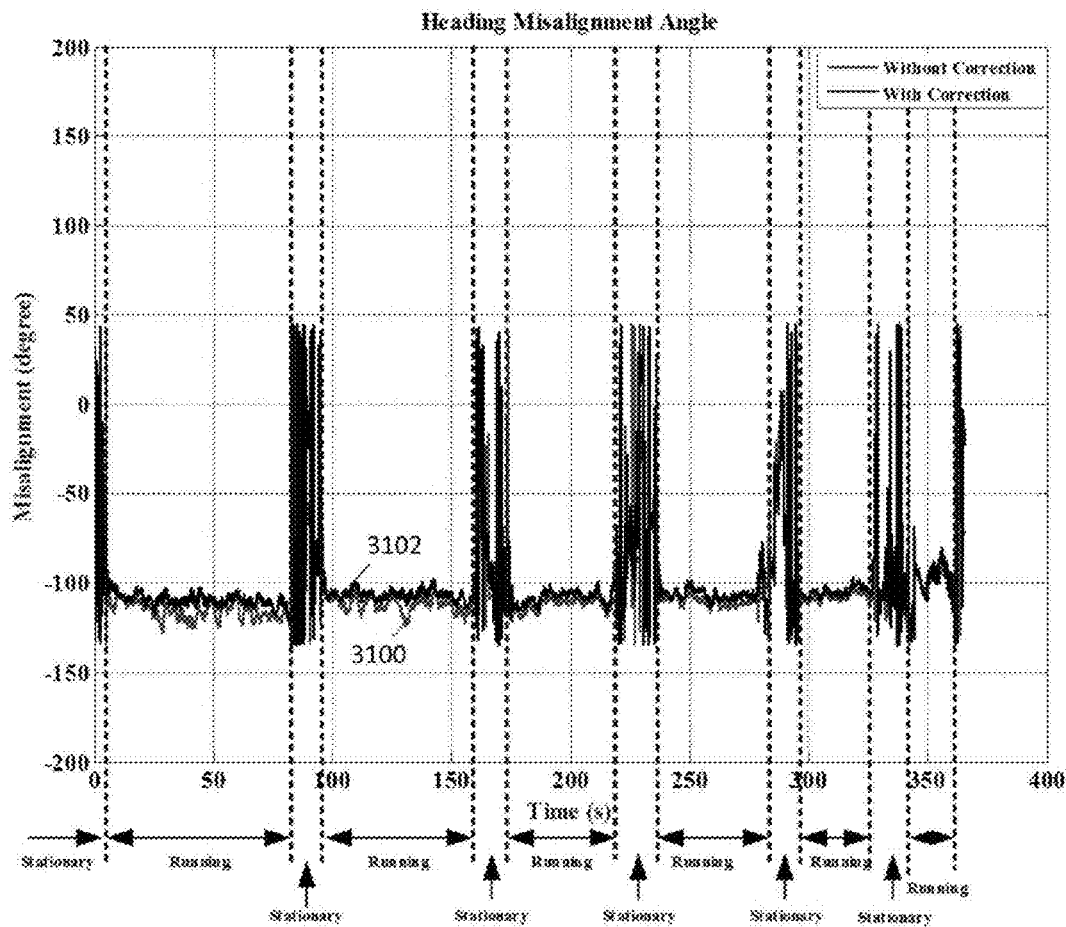
FIG. 31 is a graphical representation of heading misalignment estimation using the original and reconstructed data of FIG. 30 according to an embodiment.

Finally, the test was conducted for an leg mount use case with the original accelerometer data represented by traces 3000 and 3002 and the reconstructed data represented by traces 3004 and 3006 in FIG. 30. The reconstructed data may be seen to have the improvements noted above. As shown in FIG. 31, the heading misalignment estimations performed using the original data are represented by trace 3100 and the estimation performed using the reconstructed data represented by trace 3102. Each successive running period representing a faster speed. In this test, the expected heading misalignment is about negative 100 degrees due to the phone being fixed to the user's right leg with the screen facing the body and the speaker pointed down. A similar estimation results in this use case for the original data and the reconstructed data because the leg movement during running is strong enough to force the along-track axis to be in the same direction as the user with less perturbing influence in the sidetrack direction.

Figure 32:
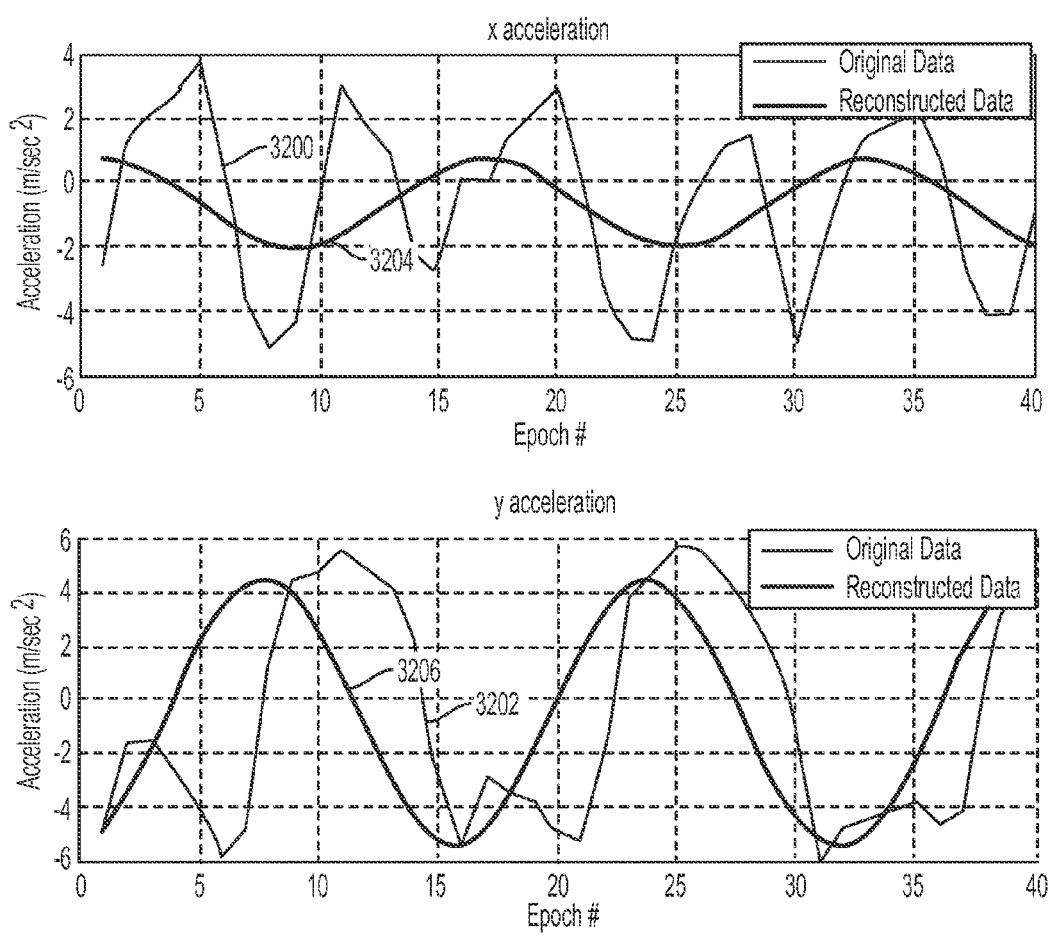
FIG. 32 is a graphical representation of original and reconstructed inertial sensor data in a running motion mode with a smart watch in an wrist mode use case according to an embodiment.
Figure 33:
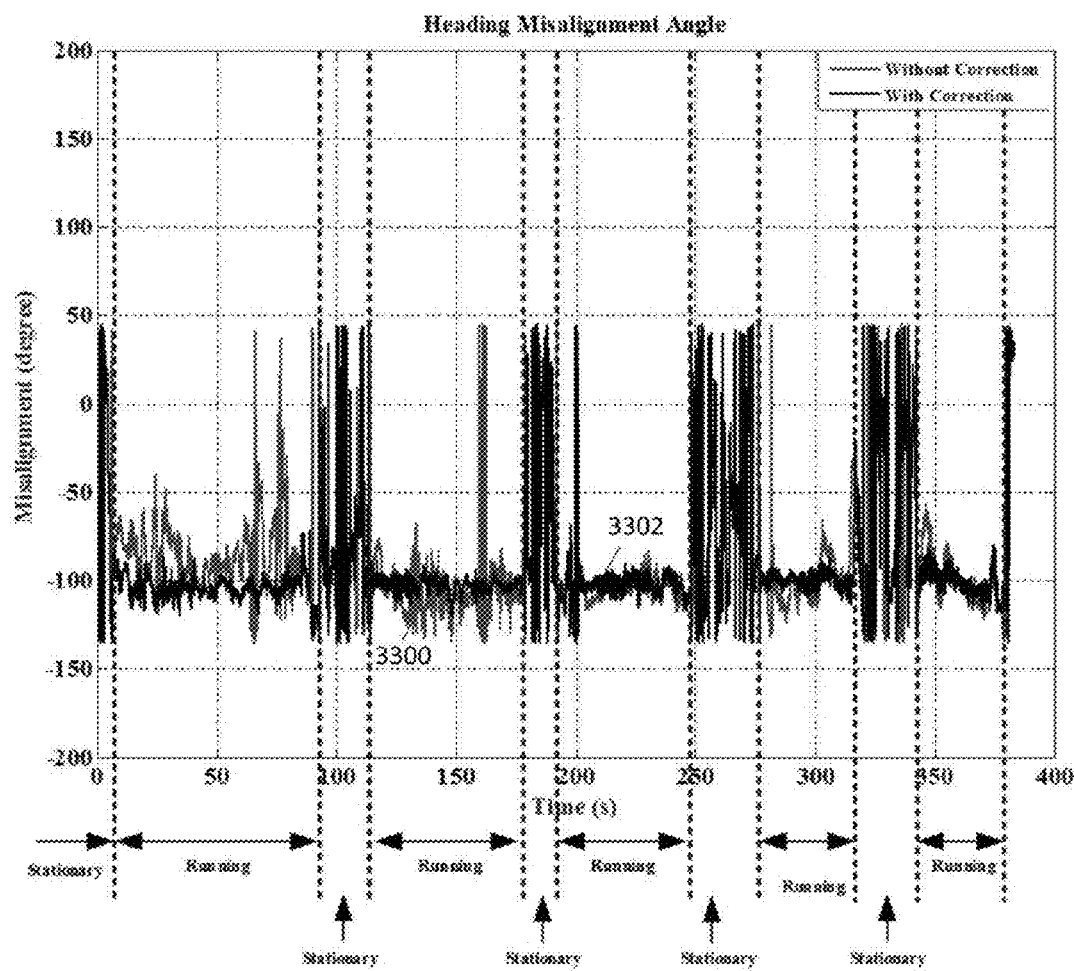
FIG. 33 is a graphical representation of heading misalignment estimation using the original and reconstructed data of FIG. 32 according to an embodiment.

In a last example, data was obtained in a running motion mode with a smart watch in an a wrist mode use case. As shown in FIG. 32, accelerometer data was obtained over a window of two seconds at a sample rate of twenty Hz for x and y accelerations. Trace 3200 in the top graph shows the original x acceleration data while trace 3202 in the bottom graph shows the original y acceleration data while trace 3204 shows the x acceleration data as reconstructed according to the techniques of this disclosure and trace 3206 shows the reconstructed y acceleration data. Each successive running period represents a faster speed. Here also, the quality of the reconstructed data is improved. The heading misalignment estimations using this data are shown in FIG. 33, with the original data resulting in trace 3300 and the reconstructed data resulting in trace 3302. The expected heading misalignment is about negative 100 degrees, with the watch worn on the left wrist. Again, the estimation performed using the reconstructed data may be seen as a significant improvement, particularly at slower running speeds.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling anchor calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell lower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to gel an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A portable device, the device being within a platform, the device comprising a sensor assembly integrated with the portable device that outputs inertial sensor data and a heading misalignment estimator configured to:
   determine an effective frequency characteristic of the inertial sensor data, wherein the effective frequency characteristic of the inertial sensor data represents periodic characteristics of motion of the platform;

process the inertial sensor data based at least in part on the determined frequency characteristic, wherein processing the inertial sensor data comprises reducing signal artifacts; and estimate a heading misalignment between a heading of the portable device and the platform using the processed inertial sensor data, wherein estimating the heading misalignment is based at least in part on a maximum variance of the processed inertial sensor data.

2. The device of claim 1, wherein the heading misalignment estimator is configured to determine the effective frequency characteristic of the inertial sensor data by performing a time domain analysis.

3. The device of claim 1, wherein the heading misalignment estimator is configured to determine the effective frequency characteristic of the inertial sensor data by performing a frequency domain analysis.

4. The device of claim 1, further comprising a band pass filter, wherein the heading misalignment estimator processes the inertial sensor data by applying the band pass filter.

5. The device of claim 1, wherein the heading misalignment estimator is further configured to estimate the heading misalignment based at least in part on a maximum variance of the processed inertial sensor data.

6. The device of claim 1, wherein the heading misalignment estimator is further configured to resolve an ambiguity in the estimated heading misalignment.

7. The device of claim 1, wherein the sensor assembly comprises an inertial sensor implemented as a Micro Electro Mechanical System (MEMS).

8. A method for navigation with a portable device associated with a platform undergoing motion having periodic characteristics, the method comprising:

obtaining inertial sensor data for the portable device;

determining an effective frequency characteristic of the inertial sensor data;

processing the inertial sensor data based at least in part on the determined frequency characteristic, wherein processing the inertial sensor data comprises reducing signal artifacts; and estimating a heading misalignment between a heading of the portable device and the platform using the processed inertial sensor data, wherein estimating the heading misalignment is based at least in part on a maximum variance of the processed inertial sensor data.

9. The method of claim 8, wherein processing the inertial sensor data comprises processing accelerometer data.

10. The method of claim 9, wherein determining the effective frequency characteristic of the inertial sensor data comprises performing a time domain analysis.

11. The method of claim 10, wherein the time domain frequency analysis is performed on a periodic signal selected from at least one of accelerometer data, leveled accelerometer data, gyroscope data, leveled gyroscope data, roll data for the portable device and pitch data for the portable device.

12. The method of claim 11, further comprising classifying at least one of a use case and a motion mode for the portable device and selecting the periodic signal for performing the time domain analysis based at least in part on the classification.

13. The method of claim 11, wherein the time domain analysis calculates peak frequency in the obtained inertial sensor data.

14. The method of claim 13, comprising processing the sensor data with the calculated peak frequency to reduce the artifacts.

15. The method of claim 14, further comprising determining coefficients at the calculated peak frequency.

16. The method of claim 15, wherein processing the inertial sensor data comprises applying the determined coefficients to reconstruct the inertial sensor data to reduce the artifacts.

17. The method of claim 9, wherein determining the effective frequency characteristic of the inertial sensor data comprises performing a frequency domain analysis.

18. The method of claim 17, wherein the frequency domain analysis is performed on a periodic signal selected from at least one of accelerometer data, leveled accelerometer data, gyroscope data, leveled gyroscope data, roll data for the portable device and pitch data for the portable device.

19. The method of claim 18, further comprising classifying at least one of a use case and a motion mode for the portable device and selecting the periodic signal for performing the frequency domain analysis based at least in part on the classification.

20. The method of claim 18, wherein the frequency domain analysis comprises a Fast Fourier Transform (FFT).

21. The method of claim 20, further comprising determining a maximum amplitude frequency component corresponding to the effective frequency characteristic.

22. The method of claim 21, comprising processing the sensor data with the determined maximum amplitude frequency component to reduce the artifacts.

23. The method of claim 22, further comprising determining coefficients at the maximum amplitude frequency component.

24. The method of claim 23, wherein processing the inertial sensor data comprises applying the determined coefficients to reconstruct the inertial sensor data to reduce the artifacts.

25. The method of claim 9, wherein processing the inertial sensor data comprises applying a band pass filter.

26. The method of claim 25, further comprising classifying at least one of a use case and a motion mode for the portable device and selecting the band pass filter based at least in part on the classification.

27. The method of claim 8, further comprising determining the maximum variance of the processed inertial sensor data using a Principle Component Analysis (PCA).

28. The method of claim 8, further comprising determining the maximum variance of the processed inertial sensor data using a binary search.

29. The method of claim 8, further comprising determining the maximum variance of the processed inertial sensor data by analytically determining an along-track axis representing a minimum sum of squared distances.

30. The method of claim 8, further comprising resolving an ambiguity in the estimated heading misalignment.

31. The method of claim 30, wherein resolving the estimated heading misalignment ambiguity comprises assessing a difference between two angles calculated between a vertical acceleration of the portable device and an along-track axis acceleration of the portable device.

32. The method of claim 31, wherein the difference between two angles calculated between a vertical acceleration of the portable device and the along-track axis acceleration of the portable device is determined as a difference between an angle representing a phase shift between a lagging vertical acceleration signal and a leading along-track axis acceleration signal and an angle representing a phase shift between a leading vertical acceleration signal and a lagging along-track axis acceleration signal.

33. The method of claim 30, wherein resolving estimated heading misalignment ambiguity comprises assessing phase shift between a vertical acceleration of the portable device and an along-track axis acceleration of the portable device.

34. The method of claim 30, wherein resolving the estimated heading misalignment ambiguity comprises determining effective motion parameters based at least in part on a maximum variance between a vertical acceleration of the portable device and an along-track axis acceleration of the portable device.

35. The method of claim 34, further comprising determining the maximum variance between the vertical acceleration of the portable device and the along-track axis acceleration of the portable device using a Principle Component Analysis (PCA).

36. The method of claim 34, further comprising determining the maximum variance between the vertical acceleration of the portable device and the along-track axis acceleration of the portable device by calculating a slope of a principle axis between the vertical acceleration of the portable device and the along-track axis acceleration of the portable device, wherein the principal axis is obtained using a binary search.

37. The method of claim 34, further comprising analytically determining the maximum variance between the vertical acceleration of the portable device and the along-track axis acceleration of the portable device by calculating a slope of a principle axis between the vertical acceleration of the portable device and the along-track axis acceleration of the portable device, wherein the principal axis represents a minimum sum of squared distances.

* * * * *